(12) United States Patent  
Kondo

(10) Patent No.: US 6,477,278 B1
(45) Date of Patent: *Nov. 5, 2002

(54) IMAGE CODING APPARATUS, IMAGE CODING METHOD, IMAGE DECODING METHOD, IMAGE DECODING APPARATUS, IMAGE DATA TRANSMITTING METHOD AND RECORDING MEDIUM

(75) Inventor: Tetsujiro Kondo, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/893,202

(22) Filed: Jul. 15, 1997

(30) Foreign Application Priority Data

Jul. 17, 1996 (JP) .............................................. 8-206552

(51) Int. Cl.⁷ .............................. G06K 9/36; G06K 9/64
(52) U.S. Cl. ........................ 382/238; 382/239; 382/232
(58) Field of Search ................................. 382/232, 234, 382/236, 238, 251, 252, 253; 348/458, 409, 415, 421, 448, 442; 341/62; 321/32.4, 67.1; 214/255, 819

(56) References Cited

U.S. PATENT DOCUMENTS

| 4,703,352 A | 10/1987 | Kondo .................... 358/135 |
| 5,122,873 A | 6/1992 | Golin ..................... 358/133 |
| 5,193,003 A | 3/1993 | Kondo .................... 358/136 |
| 5,200,962 A | 4/1993 | Kao et al. ................. 371/41 |
| 5,289,549 A | 2/1994 | Rattey et al. ............... 382/56 |

(List continued on next page.)

FOREIGN PATENT DOCUMENTS

| EP | 0293041 A1 | 11/1988 | ............ H04N/7/13 |
| EP | 0 546 845 A2 | 6/1993 | ............ H04N/7/01 |
| EP | 0635978 A1 | 1/1995 | ............ H04N/7/01 |
| EP | 0 635 978 A1 | 1/1995 | ............ H04N/7/01 |
| JP | 3-53778 | 3/1991 | ............ H04N/7/13 |
| WO | WO 91/20159 | 12/1991 | ............ H04N/7/13 |
| WO | WO 92/07445 | 4/1992 | ............ H04N/7/13 |
| WO | WO 93/13624 | 7/1993 | ............ H04N/7/13 |

OTHER PUBLICATIONS

Patent Abstracts of Japan, vol. 017, No. 331 (E–1386), Jun. 23, 1993 & JP 05 037916 A (Mitsubishi Electric Corp), Feb. 12, 1993 ★Abstract★.

Patent Abstracts of Japan, vol. 1995, No. 09, Oct. 31, 1995 & JP 07 147681 A (Sony Corp), Jun. 6, 1995.

U.S. patent application Ser. No. 08/893,134, filed Jul. 15, 1997.

U.S. patent application Ser. No. 08/892,570, filed Jul. 15, 1997.

(List continued on next page.)

*Primary Examiner*—Leo Boudreau
*Assistant Examiner*—Duy M. Dang
(74) *Attorney, Agent, or Firm*—Bell, Boyd & Lloyd LLC

(57) ABSTRACT

To obtain a decoded image almost identical to an original image using a small amount of data, compressed data obtained by thinning-out original image data is corrected and the corrected data is outputted. At a local decoder the original image data is predicted based on this corrected data and this predicted value is outputted. Then, at an error calculator a predicted error for the predicted value is calculated with respect to the original image data. The above process is then repeated at a determination unit until the prediction error is determined to be less than a prescribed value, and the corrected data when the estimation error is less than a prescribed value is then outputted as the coded results for the original image data.

120 Claims, 26 Drawing Sheets

U.S. PATENT DOCUMENTS

| | | | | |
|---|---|---|---|---|
| 5,293,230 A | | 3/1994 | Golin | 348/410 |
| 5,331,414 A | | 7/1994 | Golin | 348/390 |
| 5,349,385 A | | 9/1994 | Glenn | 348/458 |
| 5,384,869 A | | 1/1995 | Wilkinson et al. | 382/56 |
| 5,469,216 A | | 11/1995 | Takahashi et al. | 348/441 |
| 5,488,618 A | * | 1/1996 | Kondo et al. | 371/67.1 |
| 5,495,297 A | | 2/1996 | Fujimori et al. | 348/590 |
| 5,504,535 A | | 4/1996 | Abe | 348/565 |
| 5,517,245 A | | 5/1996 | Kondo et al. | 348/392 |
| 5,528,606 A | * | 6/1996 | Kondo et al. | 371/37.4 |
| 5,553,160 A | | 9/1996 | Dawson | 382/166 |
| 5,598,214 A | | 1/1997 | Kondo et al. | 348/414 |
| 5,610,658 A | | 3/1997 | Uchida et al. | 348/416 |
| 5,625,712 A | | 4/1997 | Schoenzeit et al. | 382/232 |
| 5,663,764 A | | 9/1997 | Kondo et al. | 348/414 |
| 5,666,164 A | | 9/1997 | Kondo et al. | 348/441 |
| 5,680,225 A | | 10/1997 | Hirabayashi et al. | 358/451 |
| 5,687,257 A | | 11/1997 | Paik et al. | 382/239 |
| 5,734,433 A | | 3/1998 | Kondo et al. | 348/241 |
| 5,739,873 A | | 4/1998 | Kondo | 348/720 |
| 5,754,702 A | * | 5/1998 | Simpson | 382/240 |
| 5,796,442 A | | 8/1998 | Gove et al. | 348/556 |
| 5,798,751 A | * | 8/1998 | Kauda | 345/138 |
| 5,812,699 A | | 9/1998 | Zhu et al. | 382/232 |
| 5,825,313 A | * | 10/1998 | Kondo et al. | 341/62 |
| 5,867,593 A | | 2/1999 | Fukuda et al. | 382/176 |
| 5,870,434 A | | 2/1999 | Kondo et al. | 375/242 |
| 5,880,784 A | | 3/1999 | Lillevold | 348/404 |
| 5,912,708 A | | 6/1999 | Kondo et al. | 348/415 |
| 5,930,394 A | | 7/1999 | Kondo et al. | 382/232 |
| 5,960,116 A | | 9/1999 | Kajiwara | 382/238 |
| 5,966,179 A | | 10/1999 | Kondo et al. | 348/408 |
| 5,969,764 A | | 10/1999 | Sun et al. | 348/404 |
| 6,016,164 A | | 1/2000 | Kawaguchi et al. | 348/424 |

OTHER PUBLICATIONS

U.S. patent application Ser. No. 08/893,022, filed Jul. 15, 1997.

U.S. patent application Ser. No. 08/893,216, filed Jul. 15, 1997.

U.S. patent application Ser. No. 09/213,460, filed Dec. 17, 1998.

* cited by examiner pixel to be considered

○ ···· 0
● ···· 1

IMAGE CODING APPARATUS, IMAGE CODING METHOD, IMAGE DECODING METHOD, IMAGE DECODING APPARATUS, IMAGE DATA TRANSMITTING METHOD AND RECORDING MEDIUM

BACKGROUND OF THE INVENTION

1. Field of the Invention

The present invention relates to an image coding apparatus and image coding method, image decoding apparatus, and recording medium, and more particularly relates to the image coding apparatus and image coding method, image decoding apparatus, image transmitting method and recording medium capable of thinning-out (sub-sampling) and compressing an image in such a manner as to obtain a decoded image almost identical to the original image.

2. Description of the Related Art

Conventionally, various methods have been put forward as methods for compressing images, with one of these methods being a method for compressing images by thinning-out the number of pixels.

However, when an image compressed by this kind of thinning-out is simply expanded by interpolation, the resolution of the resulting decoded image is poor.

There are two reasons for this kind of deterioration in the resolution of the decoded image. One reason is that high frequency components included in the original image are not included in the thinned-out image. A second reason is that the pixel values for pixels comprising images after thinning-out are not particularly suitable for decoding the original image. Accordingly, it would be desirable to provide methods and apparatus which resolves such problems.

SUMMARY OF THE INVENTION

As the present invention sets out to resolve these problems, the present invention is capable of thinning-out (subsampling) and compressing images in such a manner that decoded images that are identical (almost identical) to the original images can be obtained.

According to one aspect of the present invention, an image coding apparatus includes correction means which corrects compressed data obtained by compressing the original image data to a fewer number of pixels and outputs corrected data. Prediction means predicts the original image based on the corrected data and outputs the predicted value. An arithmetic means calculates a prediction error for the predicted value with respect to the original image data. Determining means determines suitability of the corrected data outputted by the correction means based on the prediction error. Outputting means outputs the corrected data as the original image data coding results in accordance with determination results of the determining means.

According to another aspect of the present invention, an image coding method compresses an original image data to a fewer number of pixels by correcting compressed data obtained by compressing the original image data and outputting corrected data, predicting the original image data based on the corrected data and outputting a predicted value and calculating a prediction error for the predicted value with respect to the original image data is repeatedly carried out until the prediction error becomes less than a prescribed threshold value, and the corrected data is then outputted as coding results for the original image data.

According to yet another aspect of the present invention, in an image decoding apparatus, coded data decoded by the decoding means is obtained when the prediction error becomes less than a prescribed threshold value as corrected data by repeatedly compressing an original image data to a fewer number of pixels, correcting compressed data obtained by compressing the original image data and outputting corrected data, predicting the original image data based on the corrected data and outputting a predicted value; and calculating a prediction error for the predicted value with respect to the original image data until the prediction error becomes less than a prescribed threshold value.

According to a further aspect of the present invention, a recording medium is recorded with corrected data when a prediction error is less than a prescribed value, obtained by repeatedly correcting compressed data obtained by compressing the original image data to a fewer number of pixels and outputting corrected data, predicting the original image data based on the corrected data and outputting a predicted value and calculating a prediction error for the predicted value with respect to the original image data until the prediction error becomes less than a prescribed threshold value.

According to another aspect of the present invention, the image coding apparatus includes prediction means having adaptive processing means for carrying out adaptive processing for obtaining predictive coefficient for each class for calculating said predicted values using a linear combination with the corrected data so as to obtain the predicted value based on this predictive coefficient.

According to yet another aspect of the present invention, the image coding apparatus includes prediction means having sorting means for sorting the corrected data into prescribed classes in response to characteristics of the corrected data and the adaptive processing means carries out adaptive processing each the prescribed class.

According to a further aspect of the present invention, the image coding apparatus includes transmitting means for transmitting the corrected data outputted by the outputting means.

According to an aspect of the present invention, the image decoding apparatus is an image coding apparatus for decoding data coded for an image, which includes decoding means for decoding the coded data, the coded data being corrected data when a prediction error is less than a prescribed value, obtained by repeatedly compressing an original image data to a fewer number of pixels, correcting compressed data obtained by compressing the original image data and outputting corrected data, predicting the original image data based on the corrected data and outputting a predicted value and calculating an estimation error for the predicted value with respect to the original image data until the prediction error becomes less than a prescribed threshold value.

These and other aspects of the invention will become apparent when considered with reference to the following description and the accompanying drawings.

DETAILED DESCRIPTION OF THE PREFERRED EMBODIMENTS

In order to clarify the corresponding relationship between each of the means of the various embodiments described herein, certain characteristics of the present invention are first briefly described with reference to the Figures. It is to be understood that the term "unit" is to be interpreted in the broadest sense, including a hard wired circuit, a main frame loaded with appropriate software, a programmed microprocessor or microcontroller, or a combination of these.

The image coding apparatus of the present invention includes compression means (for example, the compressing unit 21 etc. shown in FIG. 3) for compressing an original image to a fewer number of pixels, correction means (for example, the compressing unit 21 etc. shown in FIG. 3) for correcting compressed data obtained by compressing the original image data outputting corrected data, prediction means (for example, the local decoder 22 etc. shown in FIG. 3) for predicting the original image data based on the corrected data and outputting the predicted value, arithmetic means (for example, the error calculator 23 etc. shown in FIG. 3) for calculating a prediction error for the predicted value with respect to the original image, determining means (for example, the determining unit 24 etc. shown in FIG. 3) for determining suitability of the corrected data outputted by the correction means based on the prediction error and outputting means (for example, the determining unit 24 etc. shown in FIG. 3) for outputting the corrected data as the original image data coding results in accordance with determination results of the determining means.

The foregoing is not intended to be limited to each of the above-listed means.

Figure 1:
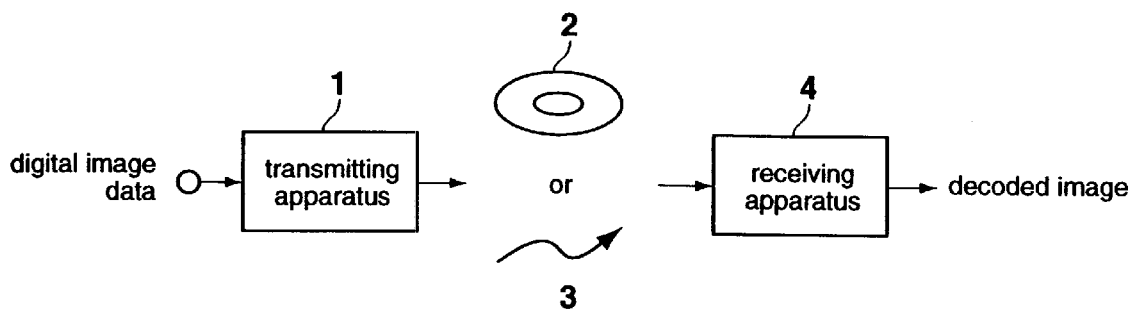
FIG. 1 is a block diagram showing a configuration of an embodiment of the present invention applied to an image processing apparatus.

Referring now to FIG. 1, an image processing system is shown. In operation, digitized image data is supplied to a transmitting apparatus 1. The transmission apparatus 1 compresses and codes inputted image data by thinning out (sub-sampling) this data (reducing the number of pixels) and records the resulting data on a recording medium 2 comprising, for example, an optical disc, magneto-optical disc or magnetic tape, etc., or transmits the resulting data via a transmission path 3 of, for example, ground waves, broadcast circuits, telephone lines or CATV networks etc.

Coded data recorded on the recording medium 2 is then played back at a receiving apparatus 4 or coded data transmitted via the transmission path 3 is received. This coded data is then expanded and decoded, with the resulting decoded image being supplied to a display not shown in the drawings.

The image processing system described above can be applied to, for example, apparatus for recording/reproducing images such as optical disc apparatus, magneto-optical disc apparatus, magnetic tape apparatus etc., and apparatus for carrying out transmission of images such as, for example, video phone apparatus, television broadcast systems and CATV systems, etc. Further, the image processing system of FIG. 1 can also be applied to portable terminals that can be utilized on the move and that are of a low transmission rate such as, for example, portable telephones, etc.

Figure 2:
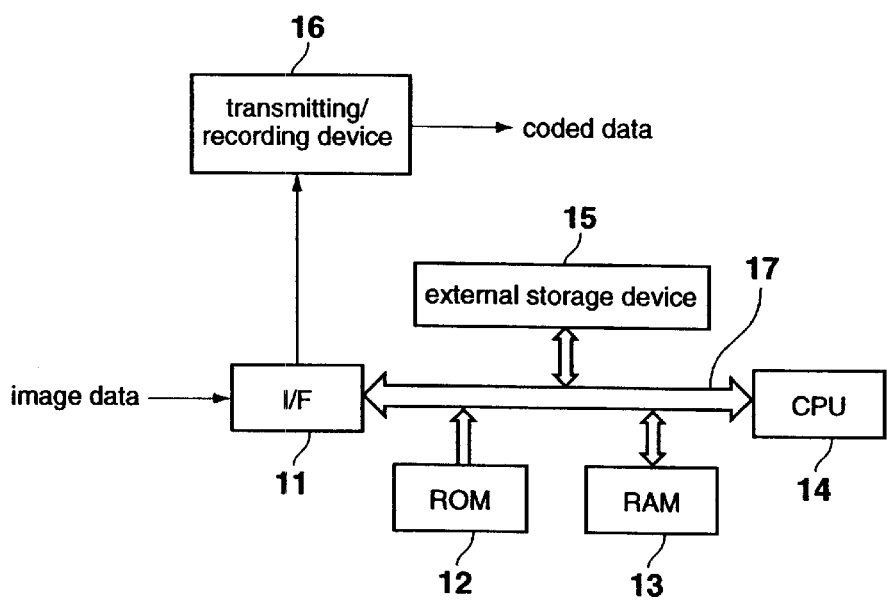
FIG. 2 is a block diagram showing an example configuration of the transmission apparatus 1 of FIG. 1.

Referring now to FIG. 2, a transmitting apparatus of a first embodiment is shown. In operation, an I/F (interface) 11 carries out receiving processing of image data received from outside and carries out transmission processing of coded data for a transmitting/recording device 16. The ROM (Read Only Memory) 12 stores a program for IPL (Initial Program Loading) use as well as other items. A RAM (Random Access Memory) 13 stores system programs (OS (Operating System)) recorded on an external storage apparatus 15 and application programs together with data necessary in the operation of the CPU (Central Processing Unit) 14. The CPU 14 loads to RAM 13 the system program and applications programs from the external storage apparatus 15 in accordance with the IPL program stored in the ROM 12 and executes application programs under the control of the system program so that the following coding processing is carried out on the image data supplied from the I/F 11. The external storage apparatus 15 is, for example, a magnetic disc apparatus etc. that stores data necessary for the operation of the CPU 14 in addition to the system program and applications programs executed by the CPU 14. The transmitting/recording device 16 then records coded data supplied from the I/F 11 on the recording medium 2 or transmits this data via the transmission path 3.

The I/F 11, ROM 12, RAM 13, CPU 14 and external storage apparatus 15 are connected together via a bus 17.

At the transmission apparatus 1 configured in this way, when image data is supplied to the I/F 11, this image data is supplied to the CPU 14. The CPU 14 then codes this image data and supplies the resulting coded data to the I/F 11. The I/F 11 then receives the coded data and supplies this data to the transmitting/recording device 16. At the transmitting/recording device 16, coded data from the I/F 11 is recorded on the recording medium 2 or transmitted via the transmission path 3.

With reference now to FIGS. 3, 4, 5, 6, 8, 11, 12, 13, 14, 15 and 16, a first embodiment of the transmitting apparatus 1 (excluding the transmitting/recording device 16) and the receiving apparatus 4 is explained. The image data (the original image data) to be coded is supplied to a compressing unit 21, local decoder 22 and error calculator 23. The compressing unit 21 simply compresses the image data by thinning-out the pixels and the resulting compressed data (image data after thinning-out) is corrected under control from a determining unit 24. The resulting corrected data generated by the compressing unit 21 is then supplied to the local decoder 22 and the determining unit 24.

The local decoder 22 makes predictions for the original image based on corrected data from the compressing unit 21 and supplies these predicted values to the error calculator 23. As is described in the following, the local decoder 22 carries out processing for obtaining predictive coefficients for each class for calculating predicted values by linear combination with the corrected data, using the corrected data and the original image data. Then the local decoder 22 carries out adaptive processing for obtaining the predicted values based on these corresponding predictive coefficients, with these predicted values being supplied to the error calculator 23 and the predictive coefficients for each class generated by local decoder 22 are supplied to the determining unit 24.

The error calculator 23 calculates the prediction error for the predicted value from the local decoder 22 with respect to the inputted image data for the original image data (source image data). This prediction error is then supplied to the determining unit 24 as error information.

The determining unit 24 determines the suitability of taking the corrected data outputted by the compressing unit 21 as the coding results for the original image data based on the error information from the error calculator 23. When the determining unit 24 determines that the corrected data outputted by the compressing unit 21 is not appropriate to be taken as the coding results for the original image data, the determining unit 24 controls the compressing unit 21, compressed data is corrected, and the resulting new corrected data is outputted. When the determining unit 24 determines that the corrected data outputted by the compressing unit 21 is suitable to be taken as the coding results for the original image data, the corrected data supplied from the compressing unit 21 is supplied to a multiplexor 25 as the optimum corrected data (hereinafter referred to for simplicity as the "optimum corrected data"). The predictive coefficient supplied from the local decoder 22 is also supplied to the multiplexor 25.

The multiplexor 25 multiplexes the optimum data (corrected data) from the determining unit 24 and the predictive coefficients for each class and outputs the results of this multiplexing to the transmitting/recording device 16 (FIG. 2) as coded data.

Figure 4:
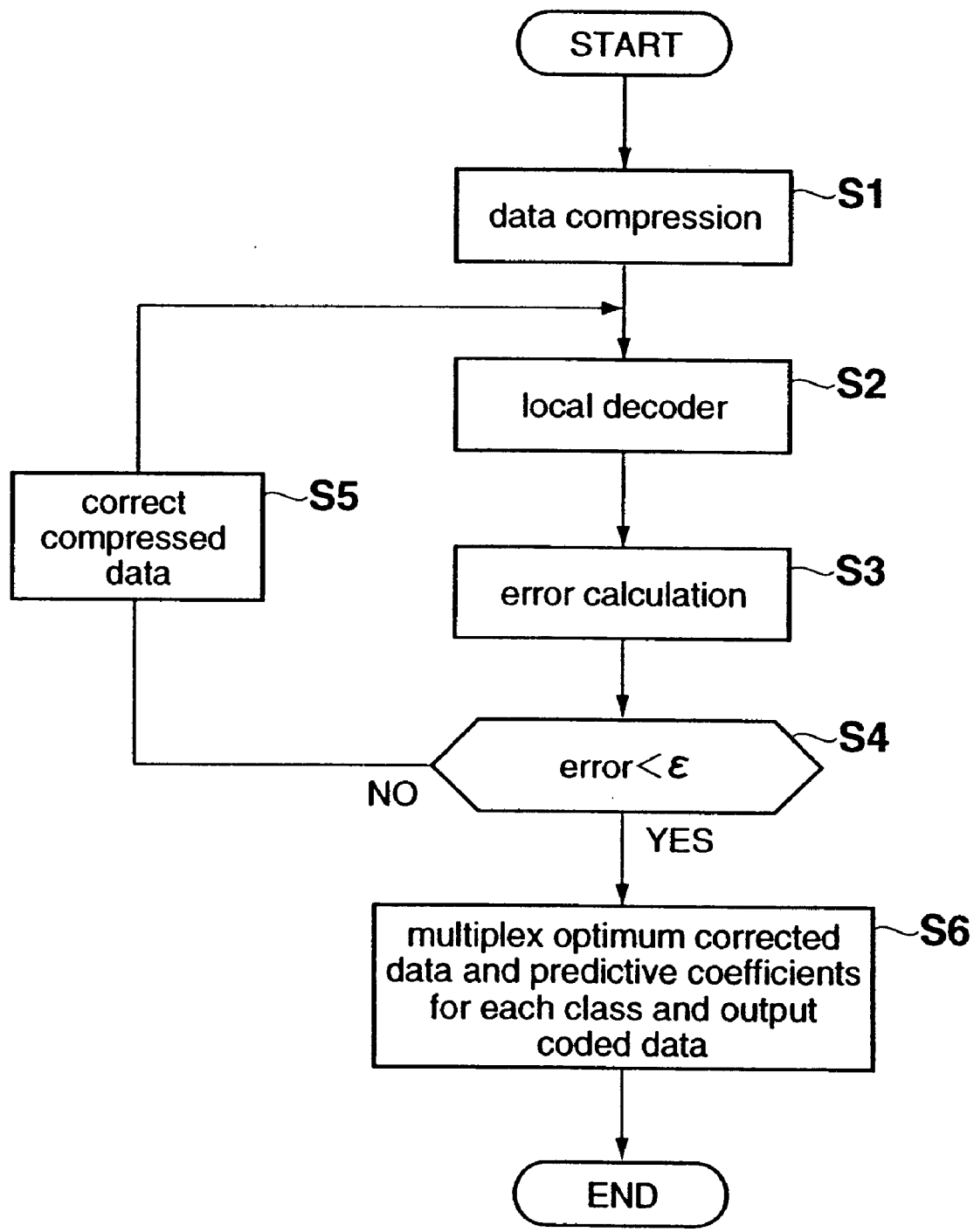
FIG. 4 is a flow chart illustrating the operation of the transmission apparatus 1 of FIG. 3.

Next, this operation is described with reference to the flow chart of FIG. 4. When image data is supplied to the compressing unit 21, in step S1 the compressing unit 21 performs compression by thinning-out this image data and first outputs this image data to the local decoder 22 and the determining part 24 without carrying out correction. Corrected data (initially this is compressed data where the image data has simply been thinned-out) is locally decoded at the local decoder 22 in step S2.

Namely, in step S2, processing for obtaining predictive coefficients for each class for calculating predicted values for an original image data by linear combination with corrected data from the compressing unit 21 using the corrected data and the original image data is carried out and adaptive processing is carried out for obtaining predicted values based on these predictive coefficients. The predictive values generated by the local decoder 22 are then supplied to the error calculator 23, and the predictive coefficients generated by local decoder 22 are supplied to the determining part 24.

Images comprised of the predicted values outputted from the local decoder 22 are the same as the decoded images obtained on the side of the receiving apparatus 4 (FIG. 1).

When predicted values for the original image data are received from the local decoder 22, the error calculator 23 calculates estimation errors for the predicted values from the local decoder 22 in step S3 with respect to the original image data and supplies these prediction errors to the determining unit 24 as error information. When error information is received from the error calculator 23, in step S4, the determining unit 24 determines whether or not the corrected data outputted by the compressing unit 21 is suitable to be taken as the coding results for the original image data based on this error information.

Namely, in step S4 a determination is made as to whether or not the error information is less than the prescribed threshold value $\epsilon$. When it is determined in step S4 that the error information is not less than the prescribed threshold value $\epsilon$, the corrected data outputted by the compressing unit 21 is confirmed to be inappropriate as the coded data for the original image data, step S5 is proceeded to and the determining unit 24 controls the compressing unit 21 so that the compressed data is corrected. The compressing unit 21 then changes the correction amount (hereinafter referred to as the corrected value $\Delta$) under the control of the determining unit 24, the compressed data is corrected and the resulting corrected data is outputted to the local decoder 22 and the determining unit 24. Step S2 is then returned and the same process is then repeated thereafter.

On the other hand, when it is determined in step S4 that the error information is less than the prescribed threshold value $\epsilon$, the corrected data outputted by the compressing unit 21 is confirmed to be suitable as the coding results for the original image data. The determining unit 24 then outputs the corrected data for when error information of less than the prescribed threshold value $\epsilon$ is obtained to a multiplexor 25 as the optimum compressed data together with the predictive coefficients for each class. At the multiplexor 25, in step S6, the optimum compressed data from the determining unit 24 and the predictive coefficients for each class are multiplexed, the resulting coded data is outputted and the process is complete.

As described above, corrected data corrected from the compression data when the error information is less than the prescribed threshold $\epsilon$ is taken as the coded results for the original image data. An image that is almost the same as the original image data (source image data) can then be obtained on the side of the receiving apparatus 4 based on this corrected data.

Figure 5:
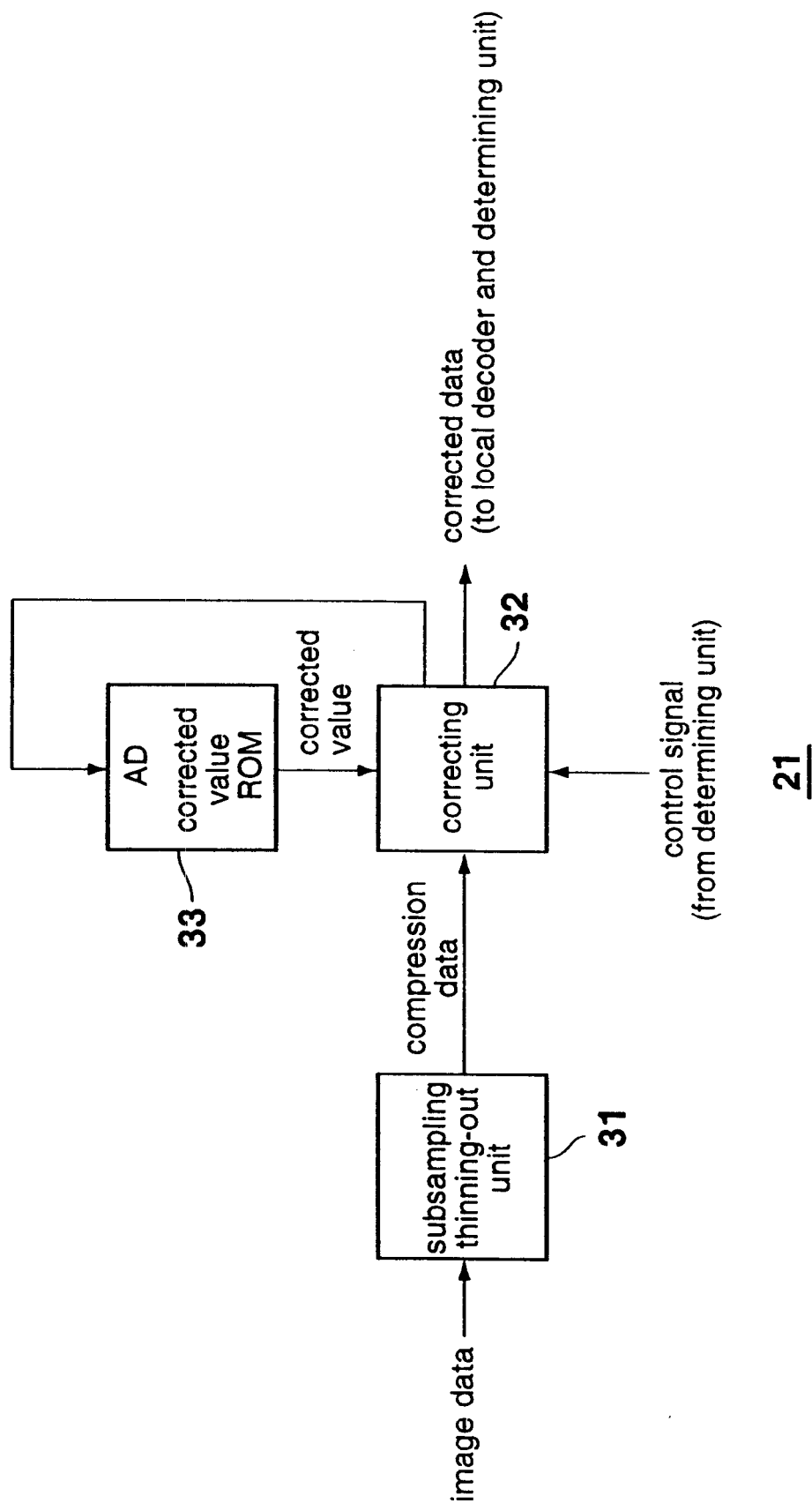
FIG. 5 is a block diagram of the compressing unit 21 of each of FIGS. 3, 17 and 21.

Next, an example configuration of the compressing unit 21 is shown in FIG. 5.

Here, image data to be encoded is inputted to a thinning-out unit 31. The thinning-out unit 31 then thins out the image data by 1 /N so that compressed data compressed by 1 /N is outputted from the thinning-out unit 31. This compressed data is then supplied from the thinning-out unit 31 to a correcting unit 32.

The correcting unit 32 then provides an address to a corrected value ROM 33 in accordance with a control signal from the determining unit 24 (FIG. 3) so that the corrected value Δ is read. The correcting unit 32 then generates corrected data by, for example, adding the corrected value Δ from the corrected value ROM 33 to the compressed data from the thinning-put unit 31. This corrected data is then supplied to the local decoder 22 and the determining unit 24. Combinations (for example, combinations of corrected values for correcting one frame portion of compressed data) of each of the various corrected values Δ are then stored by the corrected value ROM 33 in order to correct the compressed data outputted by the thinning-out unit 31. Combinations of the corrected values Δ corresponding to addresses supplied from the correcting unit 32 are then read and supplied to the correcting unit 32.

Figure 6:
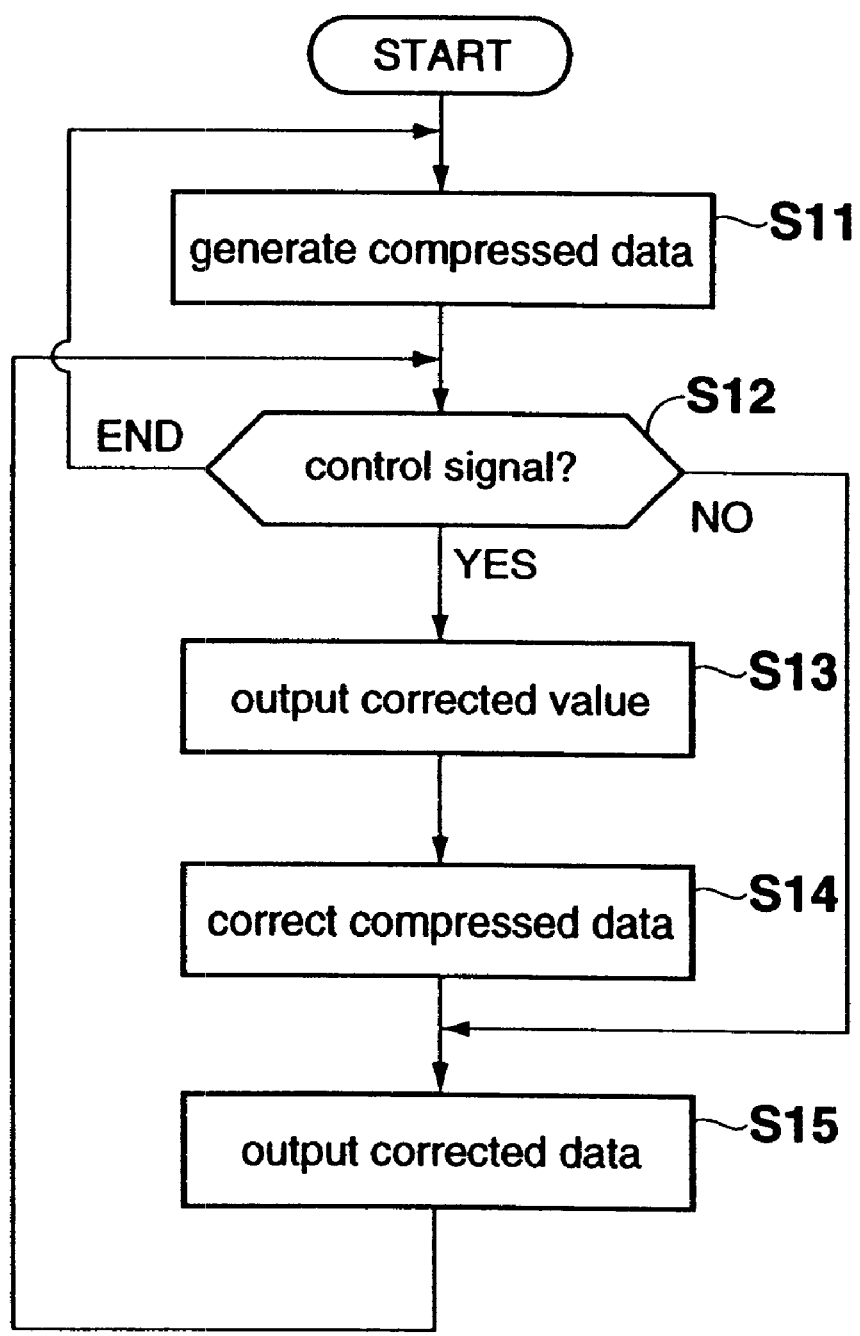
FIG. 6 is a flow chart illustrating the operation of the compressing unit 21 of FIG. 5.

Next, the process for the compressing unit 21 of FIG. 5 is described with reference to FIG. 6.

When, for example, one frame portion etc. of image data is supplied to the thinning-out unit 31, the thinning-out unit 31 thins out this image data in step S11 by 1/N and the resulting compressed data is outputted to the correcting unit 32.

Figure 7:
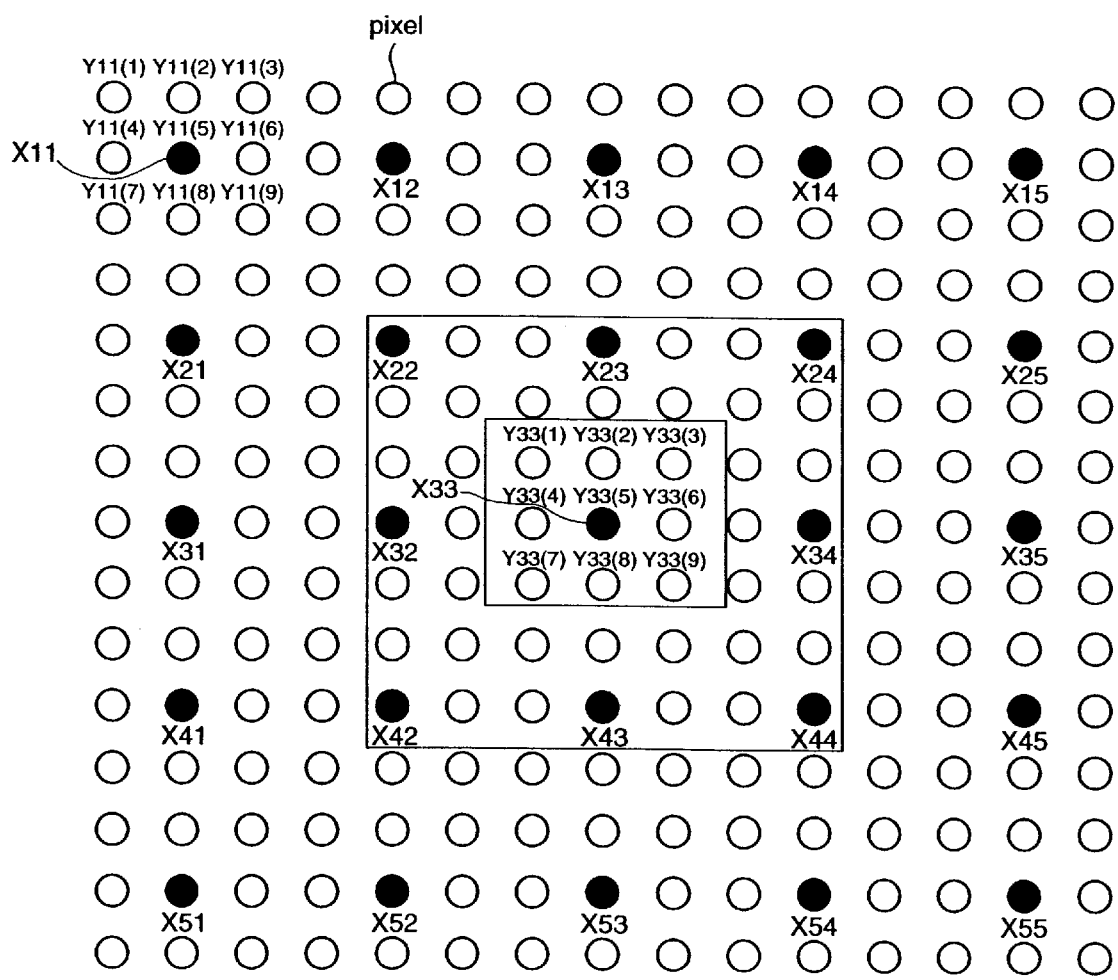
FIG. 7 is an illustration of the process of the thinning-out unit 31 of FIG. 5.

As shown in FIG. 7, the thinning-out unit 31 thins out the image data by, for example, 1/9. Namely, the thinning-out unit 31 only extracts pixels values for pixels (portions shown by the mark • in FIG. 7) in the center of each unit, taking nine pixels arranged as 3×3 (horizontal×vertical) as one unit and other portions (shown by the mark ○ in FIG. 7) are eliminated. The thinning-out unit 31 then carries out the above process in units of, for example, one frame (field) units. Compressed data where the image data for one frame is thinned-out by 1/9 is therefore supplied from the thinning-out unit 31 to the correcting unit 32. It is also possible for one frame of image to be divided into several blocks and for the thinning-out processing occurring at the thinning-out unit to be carried out in units of these blocks.

When compressed data is received from the thinning-out unit 31, in step S12 the correcting unit 32 makes a determination as to whether or not a control signal has been received from the determining unit 24 (FIG. 3), and if a control signal has been received whether the control signal has a state indicating an "end of operation." When it is determined that a control signal has not been received in step S12, step S15 is proceeded to. The correcting unit 32 then outputs compressed data from the thinning-out unit to the local decoder 22 and the determining unit 24 without modification as the corrected data and step S12 is returned to.

Namely, as described above, the determining unit 24 controls the compressing unit 21 (correcting unit 32) based on the error information. Then, directly after the compressed data has been outputted from the thinning-out unit 31, a control signal is not outputted from the determining unit 24 because error information cannot be obtained (because error information is not outputted from the error calculator 23). Therefore, directly after the compressed data is outputted from the thinning-out unit 31, the correcting unit 32 does not correct this compressed data (correcting of adding zero is carried out) and this data is outputted without modification to the local decoder 22 and the determination unit 24 as corrected data.

On the other hand, when it is determined in step S12 that a control signal has been received from the determining unit 24, in step S13 the correcting unit 32 outputs an address in accordance with this control signal to the corrected value ROM 33. As a result of this, in step S13, a combination (set) of corrected values Δ for correcting one frame portion of compressed data stored at this address is read from the ROM 33 and supplied to the correcting unit 32. When a combination of corrected values Δ is received from the corrected value ROM 33, in step S14 the correcting unit 32 adds corresponding corrected values Δ to respective one frames of compressed data so as to calculate corrected data corrected for compressed data. After this, step S15 is proceeded to, the corrected data is outputted from the correcting unit 32 to the local decoder 22 and the determining unit 24 and step S12 is returned to.

When it is determined in step S12 that a control signal having an end of operation state has been received from the determining unit 24, the process is returned to step S11, where the thinning-out unit 31 thins out this image data in step S11 by 1/N and the resulting compressed data for the following frame is processed in accordance with this flow chart.

As described above, the compressing unit 21 repeatedly outputs corrected data for the compressed data corrected to various values under the control of the determining unit 24.

When coding is completed for one frame of image, the determining unit 24 supplies a control signal indicating this point to the compressing unit 21. When the compressing unit 21 receives this control signal in step S12, the process for the present frame is finished, and a process is executed in accordance with the flow chart of FIG. 6 on the image for the following frame.

In the above case just pixel data (pixel values) for pixels at the center of pixels arranged as 3×3 are extracted at the thinning-out unit 31 so as to generate compressed data. However, for example, an average value for the 3×3 pixels can also be calculated and compressed data can be generated taking this average value as the pixel value for the pixel at the center of the 3×3 pixels.

Figure 3:
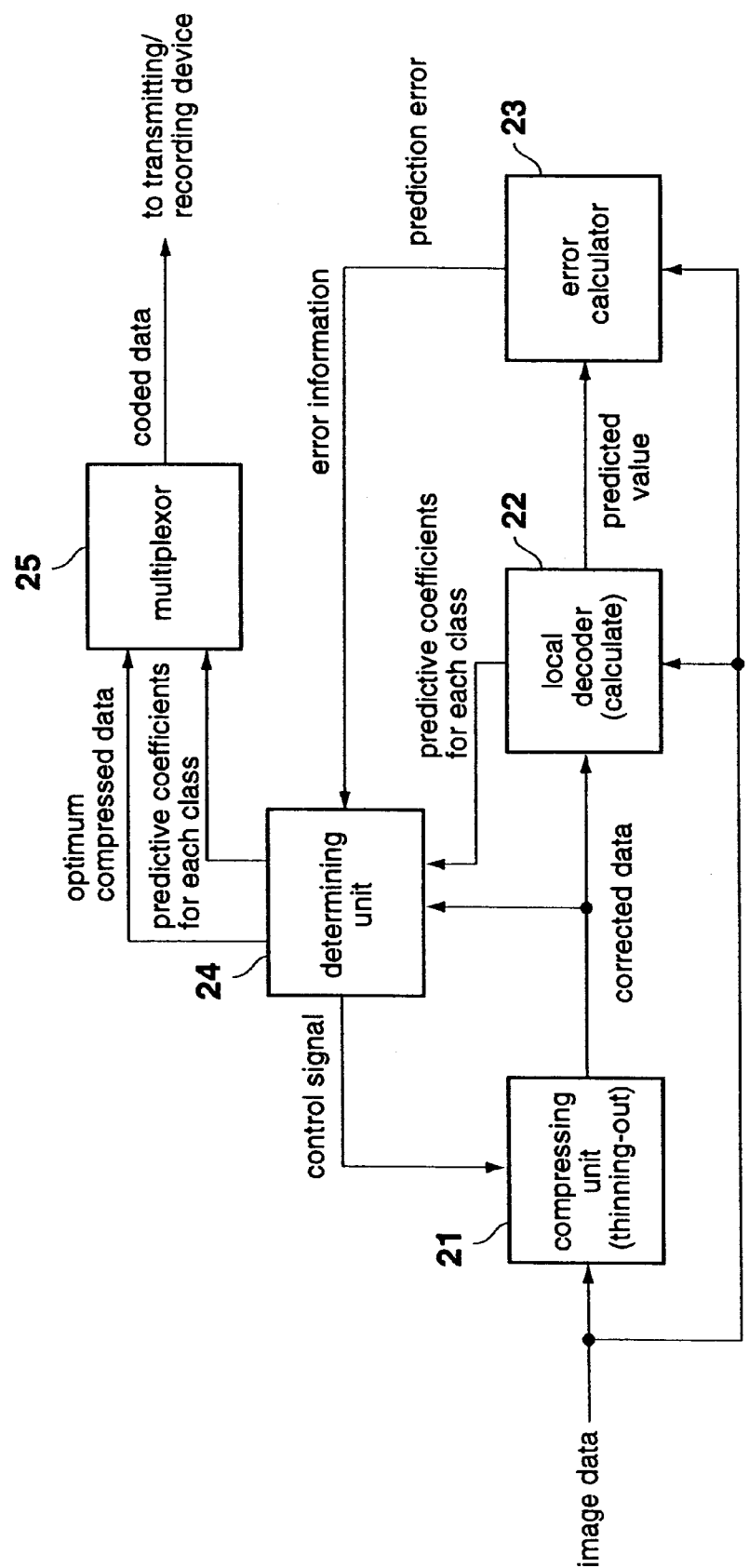
FIG. 3 is a functional block diagram of a first embodiment of the transmission apparatus 1 of FIG. 2 (excluding transmitting/recording device 16).
Figure 8:
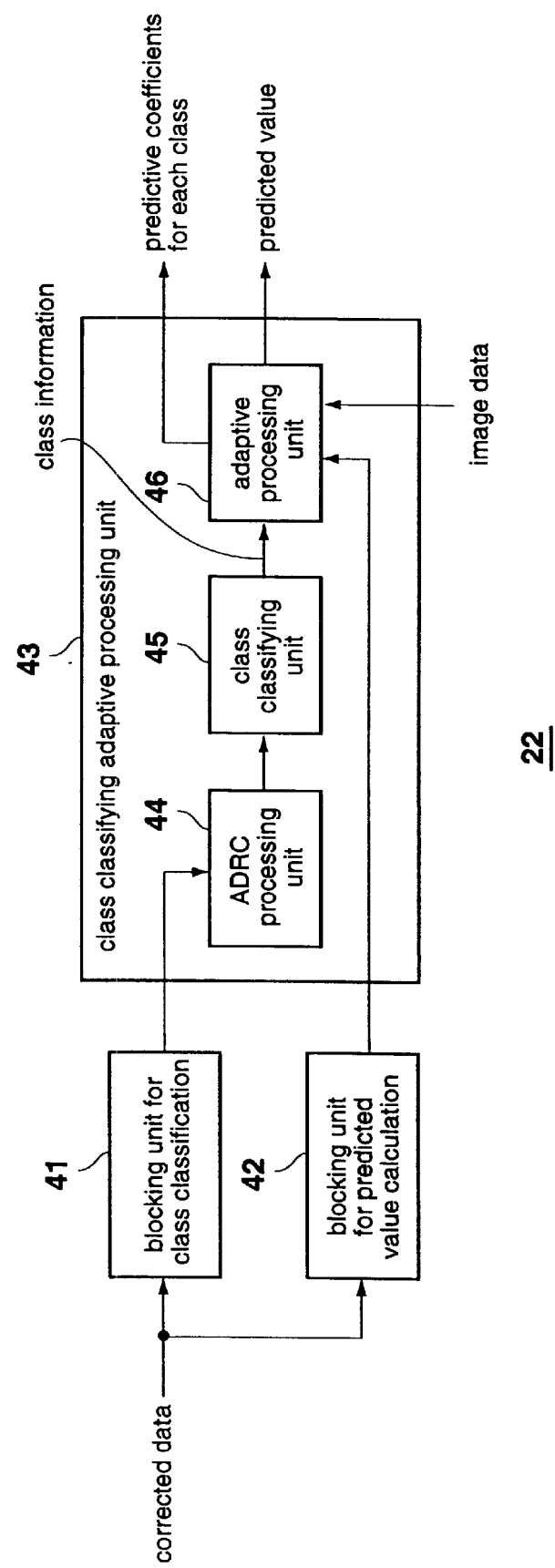
FIG. 8 is a block diagram showing an example configuration of the local decoder 22 of FIG. 3.

FIG. 8 shows an example configuration of the local decoder 22 of FIG. 3.

Corrected data from the compressing unit 21 is supplied to a blocking unit for class classification 41 and to a blocking unit for predicted value calculation 42. The blocking unit for class classification 41 then puts the corrected data into the form of blocks for class classifying centered about the noted corrected data that are units for classifying into prescribed classes in response to the characteristics of the corrected data.

Namely, in FIG. 7, when the top to the ith and the left to the jth corrected data (compressed data) (or pixels) (portions shown by the mark • in FIG. 7) is expressed as $X_{ij}$, the blocking unit for class classification 41 constructs a class classifying block comprising a total of nine pixels of the eight pixels $X_{(i-1)(j-1)}$, $X_{(i-1)j}$, $X_{(i-1)(j+1)}$, $X_{i(j-1)}$, $X_{i(j+1)}$, $X_{(i+1)(j-1)}$, $X_{(i+1)j}$, $X_{(i+1)(j+1)}$, to the upper left, top, upper right, left, right, lower left, bottom, and lower right of the noted pixel $X_{ij}$, plus the noted pixel itself. This class classifying block is then supplied to a class classifying adaptive processing circuit 43.

In this case, the class classifying block comprises a square-shaped block of 3×3 pixels but the shape of the class classifying block does not have to be square, and can be, for example, rectangular, cross-shaped or another arbitrary shape. The number of pixels comprising the class classifying block is also by no means limited to a nine pixel of 3×3 pixels block.

The blocking unit for predicted value calculation 42 puts the corrected data into the form of blocks for predicted value use centered about the noted corrected data that are units for calculating the predicted value for the original image data. Namely, in FIG. 7, taking the corrected data Xij (the portions shown by • in FIG. 7) as the center and expressing the nine pixel values of 3×3 occurring in the original image data (source picture data) as $Y_{ij(1)}, Y_{ij(2)}, Y_{ij(3)}, Y_{ij(4)}, Y_{ij(5)}, Y_{ij(6)}, Y_{ij(7)}, Y_{ij(8)}, Y_{ij(9)}$, in order to calculate predicted values for the pixels $Y_{ij(1)}$ to $Y_{ij(9)}$, the blocking circuit for predicted value calculation 42 configures a square block for predicted value calculating use comprising, for example, the twenty-five pixels of $X_{(i-2)(j-2)}, X_{(i-2)(j-1)}, X_{(i-2)j}, X_{(i-2)(j+1)}, X_{(i-2)(j+2)}, X_{(i-1)(j-2)}, X_{(i-1)(j-1)}, X_{(i-1)j}, X_{(i-1)(j+1)}, X_{(i-1)(j+2)}, X_{i(j-2)}, X_{i(j-1)}, X_{ji}, X_{i(j+1)}, X_{i(j+2)}, X_{(i+1)(j-2)}, X_{(i+1)(j-1)}, X_{(i+1)j}, X_{(i+1)(j+1)}, X_{(i+1)(j+2)}, X_{(i+2)(j-2)}, X_{(i+2)(j-1)}, X_{(i+2)j}, X_{(i+2)(j+1)}$ and $X_{(i+2)(j+2)}$ centered about the pixel Xij as a 5×5 matrix.

Specifically, as, for example, a block for estimation error calculating use is configured from pixels $X_{11'}, X_{12'}, X_{13'}, X_{14'}, X_{15'}, X_{21'}, X_{22'}, X_{23'}, X_{24'}, X_{25'}, X_{31'}, X_{32'}, X_{33'}, X_{34'}, X_{35'}, X_{41'}, X_{42'}, X_{43'}, X_{44'}, X_{45'}, X_{51'}, X_{52'}, X_{53'}, X_{54'}$ and $X_{55'}$ in order to calculate predicted values for the nine pixels $Y_{33(1)'}$ to $Y_{33(9)'}$ occurring in the image for the original image enclosed by the quadrilateral shape in FIG. 7.

Blocks for use in predicted value calculation obtained at the blocking circuit for predicted value calculation 42 are supplied to the class classifying adaptive processing circuit 43.

The number of pixels and shape of the block for predicted value calculation use, as with the case for the blocks for class classifying use, is also not limited by the above. However, it is preferable for the number of pixels comprising the block for predicted value calculation to be greater than the number of pixels comprising the block for class classifying use.

When the above blocking is carried out (this is the same for processes other than blocking processes) and there is no corresponding pixel in the vicinity of the picture frame for the image, processing is carried out as though, for example, the same pixels as the pixels comprising the picture frame exist on the outside.

The class classifying adaptive processing unit 43 comprises an ADRC (Adaptive Dynamic Range Coding) processing unit 44, a class classifying unit 45 and an adaptive processing unit 46 and carries out class classifying adaptive processing.

Class classifying adaptive processing classifies an input signal into a number of classes based on the characteristics of the input signal and then executes the adaptive processing appropriate to each class. Class classifying adaptive processing can therefore be largely divided into class classifying processing and adaptive processing.

Here, a simple description is given of class classifying processing and adaptive processing.

First, class classifying processing will be described.

Figure 9A:
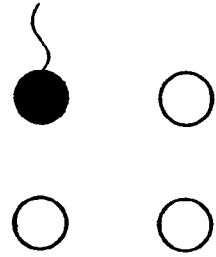
FIGS. 9(A) and 9(B) illustrate a class classifying process.
Figure 9B:
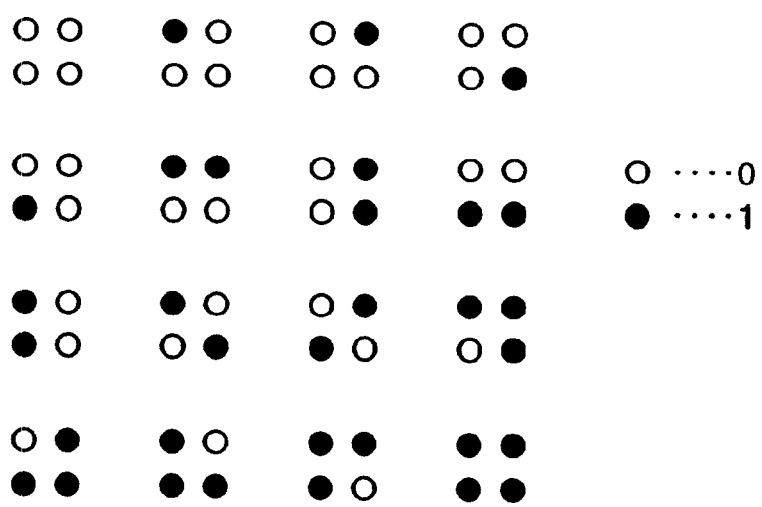

As shown, for example, in order to simplify the description, in FIG. 9(A), a block is configured of 2×2 pixels (a block for class classifying use) using a certain noted pixel and three pixels neighboring this noted pixel and each pixel is taken to be expressed by one bit (of a level of either 0 or 1). In this case, the 2×2 four pixel block is classified into 16 $(=(2^1)^4)$ patterns as shown in FIG. 9(B) using the distribution of each of the pixel levels. This kind of pattern dividing is the class classifying process and is carried out by the class classifying unit 45.

The class classifying process can be carried out in such a manner as to take into consideration the activity (image complexity) of the image (image within a block) (severity of change).

Usually, for example, about 8 bits are allotted to each pixel. Further, in this embodiment, as described above, the class classifying blocks comprise nine pixels of 3×3. Therefore, because class classifying processing is carried out targeting this kind of block for class classifying use, an enormous number of $(2^8)^9$ classes can be classified.

In this embodiment, ADRC processing is carried out on the block for class classifying use at the ADRC processing unit 44. The number of classes can then be reduced by making the number of bits for the pixels comprising the blocks for class classifying use small.

Figure 10A:
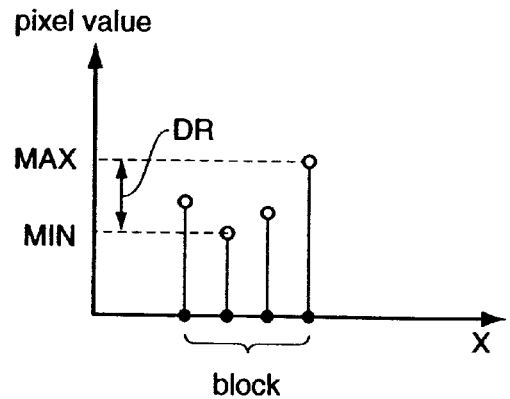
FIGS. 10(A), 10(B) and 10(C) are diagrams which illustrate the ADRC process.

For example, in order to simplify the description, as shown in FIG. 10(A), considering the block comprising four pixels lined-up above the straight line, the maximum value MAX and the minimum value MIN for these pixels is detected in the ADRC processing. DR=MAX−MIN is then taken as the localized dynamic range of the block and the pixel values of the pixels comprising this block are requantized to K-bits based on this dynamic range DR.

Figure 10B:
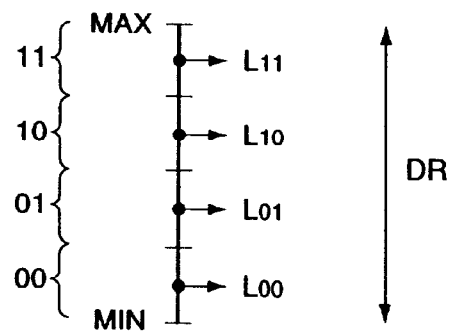

Namely, the minimum value MIN is subtracted from the values for each of the pixels within a block and this subtracted value is divided by $DR/2^K$ and converted to a code corresponding to the resulting divided value. Specifically, when, for example, K=2, as shown in FIG. 10(B), the divided value divides the dynamic range DR into four $(=2^2)$ equal parts and a determination is made as to which range the pixel values belong to. When the divided value belongs to the range of the lowermost level, the range of the second lowermost level, the range of the third lowermost level or the range of the uppermost level, coding is carried out into two bits of, for example, 00B, 01B, 10B or 11B, respectively (B indicates a binary number). As illustrated by FIG. 10(B), decoding is then carried out on the decoding side by converting the ADRC code 00B, 01B, 10B and 11B to the center value L00 of the range for the lowermost level, the center value L01 for the range for the second lowermost level, the center value L10 for the range for the third lowermost level and the center value L11 for the range for the uppermost level. The minimum value MIN is then added to this value. This kind of ADRC processing is referred to as non-edge matching.

Figure 10C:
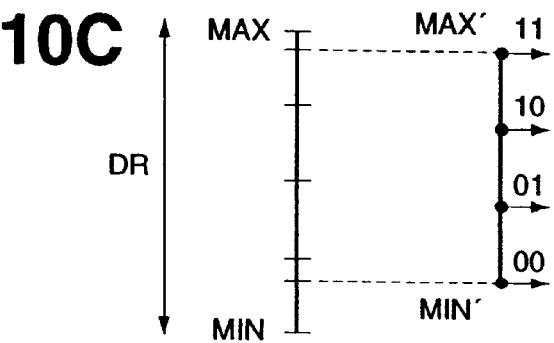

An improved non-edge matching method is illustrated by FIG. 10(C). In this improved type of non-edge matching, the dynamic range DR is divided into four equal parts and the mean value MIN' for the pixel value belonging to the range of the lowermost level and the mean value MAX' for the pixel value belonging to the range of the uppermost level are converted to ADRC codes 00B and 11B. The levels dividing the dynamic range DR' (into three equal parts) defined by MAX'−MIN' are converted to ADRC codes 01B and 10B so that ADRC decoding is carried out. This is an improvement of ADRC processing.

This ADRC processing is disclosed in detail in, for example, Japanese Laid-open Patent Publication Hei. 3-53778.

The class number can be reduced in the above way by performing ADRC processing by requantizing at a bit number smaller than the bit number allotted to the pixels comprising the blocks, with this kind of ADRC processing being carried out at the ADRC processing unit 44.

In this embodiment, class classifying is carried out at the class classifying unit 45 based on the ADRC code outputted from the ADRC processing unit 44. However, class classifying processing can also be carried out taking as an object data on which, for example, DPCM (estimation coding), BTC (Block Truncation Coding), VQ (Vector Quantization), DCT (Discrete Cosine Transform) and Adamar Transform coding are performed.

Next, adaptive processing will be described.

For example, the predicted value E[y] of the pixel value y for the original image data can be considered to be obtained using a linear first order coupling model defined by pixel values (in this embodiment, corrected data, hereinafter referred to as learning data) $x_1, x_2, \ldots$ for several pixels in this vicinity and prescribed predictive coefficients $w_1, w_2, \ldots$. In this case, the predicted value E[y] is shown by the following equation.

$$E[y] = w_1 x_1 + w_2 x_2 + \ldots \quad (1)$$

In order to generalize, the matrix W that is the set for the predictive coefficient w, the array X that is the set for the learning data and the array Y' that is the set for the predicted value E[y] is then defined by:

$$X = \begin{pmatrix} X_{11} & X_{12} & \cdots & X_{1n} \\ X_{21} & X_{22} & \cdots & X_{2n} \\ \cdots & \cdots & \cdots & \cdots \\ X_{m1} & X_{m2} & \cdots & X_{mn} \end{pmatrix} \quad W = \begin{pmatrix} W_1 \\ W_2 \\ \cdots \\ W_n \end{pmatrix}, \quad Y' = \begin{pmatrix} E[y_1] \\ E[y_2] \\ \cdots \\ E[y_n] \end{pmatrix}$$

The following trial equation can then be arrived at.

$$XW = Y' \quad (2)$$

A predicted value E[y] near to the pixel value y of the original image data can be obtained by applying the least square method to this trial equation. In this case, when the matrix Y that is the set for the pixel values (referred to in the following as "teacher data") y for the image for the original image data and the matrix E for the set for a remainder e for the predicted value E[y] with respect to the image value y for the original image data are defined as

[Equation 2]

$$E = \begin{pmatrix} e_1 \\ e_2 \\ \cdots \\ e_m \end{pmatrix}, \quad Y = \begin{pmatrix} y_1 \\ y_2 \\ \cdots \\ y_n \end{pmatrix}$$

the following remainder equation can be arrived at from equation 2.

$$XW = Y + E \quad (3)$$

The predictive coefficient wi for the original image data for obtaining the predicted value E[y] close to the pixel value y for the original image data can then be obtained in such a manner as to make a minimum error.

[Equation 3]

$$\sum_{i=1}^{m} e_i^2$$

Therefore, the square error differentiated by the predictive coefficient wi becomes zero, i.e. the predictive coefficient wi fulfilling the following equation is the most suitable-value for obtaining a predicted value E[y] near to the pixel value y for the original image data.

[Equation 4]

$$e_1 \frac{\partial e_1}{\partial w_i} + e_2 \frac{\partial e_2}{\partial w_i} + \cdots + \frac{\partial e_m}{\partial w_i} = 0 \quad (1 = 1, 2, \ldots, n) \quad (4)$$

Here, the following equation is first arrived at by differentiating equation (3) by the predictive coefficient wi.

[Equation 5]

$$\frac{\partial e_1}{\partial w_i} x_{i1}, \frac{\partial e_i}{\partial w_2} = x_{i2}, \ldots, \frac{\partial e_i}{\partial w_n} = x_e, \quad (1 = 1, 2, \ldots, m) \quad (5)$$

Equation (6) is then obtained from equation (4) and equation (5).

[Equation 6]

$$\sum_{i=1}^{m} e_i x_{i1} = 0, \sum_{i=1}^{m} e_i x_{i2} = 0, \cdots \sum_{i=1}^{m} e_i x_{in} = 0 \quad (6)$$

The following regular equation can then be obtained from equation (6) by considering the relationship between the learning data x of the remainder equation (3), the predictive coefficient w, the teacher data y, and the remainder e.

[Equation 7]

$$\begin{cases} \left(\sum_{i=1}^{m} x_{i1} x_{i1}\right) w_1 + \left(\sum_{i=1}^{m} x_{i1} x_{i2}\right) w_2 + \cdots + \left(\sum_{i=1}^{m} x_{i1} x_{in}\right) W_n = \left(\sum_{i=1}^{m} x_{i1} y_i\right) \\ \left(\sum_{i=1}^{m} x_{i2} x_{i1}\right) w_1 + \left(\sum_{i=1}^{m} x_{i2} x_{i2}\right) w_2 + \cdots + \left(\sum_{i=1}^{m} x_{i2} x_{in}\right) w_n = \left(\sum_{i=1}^{m} x_{i2} y_i\right) \\ \left(\sum_{i=1}^{m} x_{in} x_{i1}\right) w_1 + \left(\sum_{i=1}^{m} x_{in} x_{i2}\right) w + \cdots + \left(\sum_{i=1}^{m} x_{in} x_{in}\right) w = \left(\sum_{i=1}^{m} x_{in} y_i\right) \end{cases} \quad (7)$$

The regular equation of equation (7) has just the same number as the number of predictive coefficients w to be obtained. The most suitable predictive coefficient w can then be obtained by solving equation (7). Equation (7) can be solved by applying, for example, a release method (such as the Gauss Jordan elimination method) etc.

With the above adaptive processing, the most suitable predictive coefficients w for each class is obtained, and a predicted value E[y] near to the pixel value y for the original image data is obtained from equation (1) using this predictive coefficient w. This adaptive processing is carried out at the adaptive processing unit 46.

Adaptive processing differs from interpolation processing in that components included in the original image data that are not included in the thinned-out image are reproduced. Namely, if just equation (1) is utilized in adaptive processing this is the same as interpolation processing using a so-called interpolation filter. However, because the predictive coefficient w corresponding to the tap number of this interpolation filter is obtained using so-called learning using the teaching data y, components included in the original image data can be reproduced. The adaptive processing can be said to be a process that is an operation of reproducing the so-called image.

Figure 11:
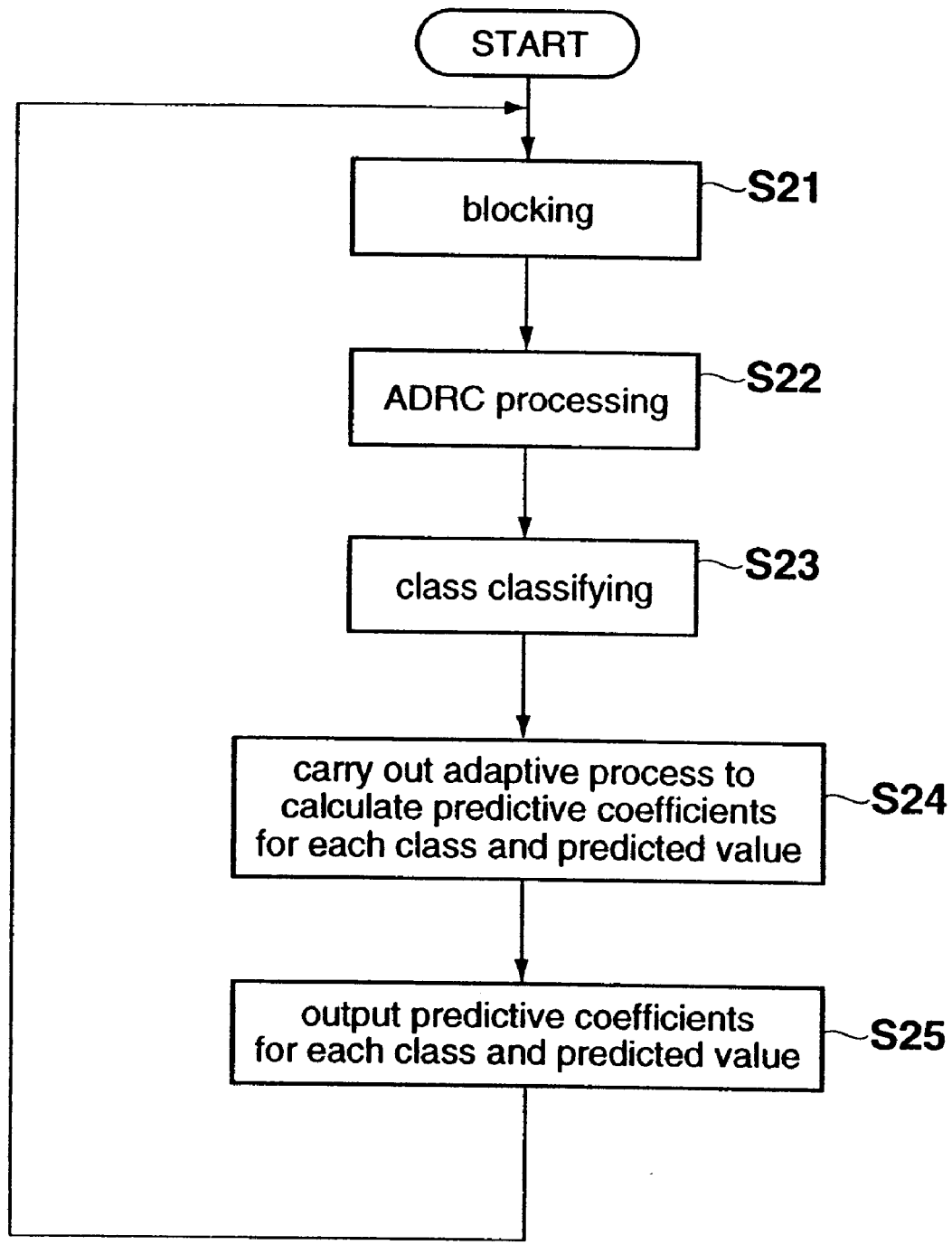
FIG. 11 is a flow chart illustrating the operation of the local decoder 22 of FIG. 8.

Next, a description will be given with reference to the flow chart of FIG. 11 of the operation of the local decoder 22 of FIG. 8.

First, in step S21, the local decoder 22 puts corrected data from the compressing unit 21 into the form of blocks. Namely, at the blocking circuit for class classification 41, the corrected data is put into the form of 3×3 pixel blocks centered about the noted corrected data for class classifying use and supplied to the class classifying adaptive processing circuit 43. Further, at the blocking circuit for predicted value calculation 42, the corrected data is put into the form of 5×5 pixel blocks centered about the noted corrected data for predicted value calculation and supplied to the class classifying adaptive processing circuit 43.

Image data for the original image data is also supplied to the class classifying adaptive processing circuit 43 in addition to the blocks for class classifying use and the blocks for predicted value calculation. The blocks for class classifying use are supplied to the ADRC processing unit 44 and the blocks for predicted value calculation use and the image data for the original image data are supplied to the adaptive processing unit 46.

In step S22, when the blocks for class classifying are received, the ADRC processing unit 44 subjects the blocks for class classifying use to, for example, one bit ADRC (ADRC carried out using one bit quantization) processing so that the corrected data is converted (coded) into one bit and outputted to the class classifying unit 45. In step S23, the class classifying unit 45 subjects the blocks for class classifying use that have been ADRC processed to class classifying processing. Namely, the class classifying unit 45 detects a state of distribution of each of the levels in the block and determines the classes that these class classifying blocks belong to. The results of this class determination are then supplied to the adaptive processing unit 46 as class information.

In this embodiment, each of the blocks for class classifying use belong to one of the 512 (=(2¹)⁹) classes because class classifying dividing has been carried out on the blocks for class classifying comprising 9 pixels arranged as 3×3 that have undergone one-bit ADRC processing.

Step S24 is then proceeded to and adaptive processing is performed at the adaptive processing unit 46 for each class based on class information from the class classifying unit 45 so that predictive coefficients for each class and predicted values for the original image data of 1 frame can be calculated.

Namely, in this embodiment, 25×9 predictive coefficients for each class are calculated using the corrected data and the original image data for 1 frame when certain corrected data is taken as noted data. If the total of nine pixels of the pixel corresponding to this noted corrected data and the eight pixels surrounding this pixel are calculated by carrying out adaptive processing using 25×9 predictive coefficients and blocks for predicted value calculating use comprising 5×5 pixels centered about the noted corrected data in response to class information.

Specifically, for example, when class information C for the block for class classifying use comprising the 3×3 corrected data $X_{22}$, $X_{23}$, $X_{24}$, $X_{32}$, $X_{33}$, $X_{34}$, $X_{42}'$, $X_{43}'$ and $X_{44}$ centered about the corrected data $X33$ shown in FIG. 7 is outputted from the class classifying unit 45 and a block for predicted value calculating use corresponding to the block for class classifying use, comprising corrected data $X_{11}'$, $X_{12}'$, $X_{13}'$, $X_{14}'$, $X_{15}'$, $X_{21}'$, $X_{22}'$, $X_{23}'$, $X_{24}'$, $X_{25}'$, $X_{31}'$, $X_{32}'$, $X_{33}'$, $X_{34}'$, $X_{35}'$, $X_{41}'$, $X_{42}'$, $X_{43}'$, $X_{44}'$, $X_{45}'$, $X_{51}'$, $X_{52}'$, $X_{53}'$, $X_{54}'$ and $X_{55}'$ for the 5×5 pixels centered about the corrected data $X33$ is outputted from the blocking circuit for predicted value calculation 42 as a block for predicted value calculating use, the corrected data comprising this block for estimated value calculating use is first taken as learning data, and the 3×3 pixel (the portion surrounded by the quadrilateral in FIG. 7) values $Y33(1)$ to $Y33(9)$ centered about the corrected data $X33$ are taken as teacher data so that the regular equation shown in equation (7) is fulfilled.

For example, for 1 frame, when the regular equation is also fulfilled in the same way for other blocks for predicted value calculating use corresponding to other blocks for class classifying use classified by the class information C and the predictive coefficients $w1(k)$ to $w_{25}(k)$ (in this embodiment, 25 items of learning data are used to obtain one predicted value and 25 predictive coefficients w are therefore needed) for obtaining a predicted value $E[Y_{33}(k)]$ for a predicted value $Y_{33}(k)$ (where k=1, 2, . . . 9) are calculated if at all possible to just the number for obtaining the regular equation (the process for fulfilling the regular equation is carried out in step S24 until a regular equation of this number is obtained), with respect to the class information C, the most suitable predictive coefficients $w1(k)$ to $w_{25}(k)$. for obtaining the predicted value $E[Y_{33}(k)]$ for the pixel value $Y_{33}(k)$ is calculated by resolving this regular equation. The above processing is carried out for each class, 25×9 predictive coefficients are calculated. The predicted value $E[Y_{33}(k)]$ can then be obtained in accordance with the following equation corresponding to the equation (1) using 25×9 predictive coefficients corresponding to class information C' and the 25 pixels in the block for predicted value use.

$$E[Y33(k)] = w_1(k)X_{11} + w_2(k)X_{12} + w_3(k)X_{13} + w_4(k)X_{14} + \quad (8)$$
$$w_5(k)X_{15} + w_6(k)X_{21} + w_7(k)X_{22} + w_8(k)X_{23} +$$
$$w_9(k)X_{24} + w_{10}(k)X_{25} + w_{11}(k)X_{31} +$$
$$w_{12}(k)X_{32} + w_{13}(k)X_{33} + w_{14}(k)X_{34} +$$
$$w_{15}(k)X_{35} + w_{16}(k)X_{41} + w_{17}(k)X_{42} +$$
$$w_{18}(k)X_{43} + w_{19}(k)X_{44} + w_{20}(k)X_{45} +$$
$$w_{21}(k)X_{51} + w_{22}(k)X_{52} + w_{23}(k)X_{53} +$$
$$w_{24}(k)X_{54} + w_{25}(k)X_{55}$$

In step S24, after 25×9 predictive coefficients for each class are calculated, 3×3 predicted values are calculated in units of 3×3 pixels centered about the noted corrected data. Thereafter, in step S25, the 25×9 predictive coefficients for each class are provided determining unit 24, and predicted values are provided to error calculator 23 for each 3×3 pixels. Step S21 is then returned to and the same process is repeated thereafter, for example, for each one frame.

Figure 12:
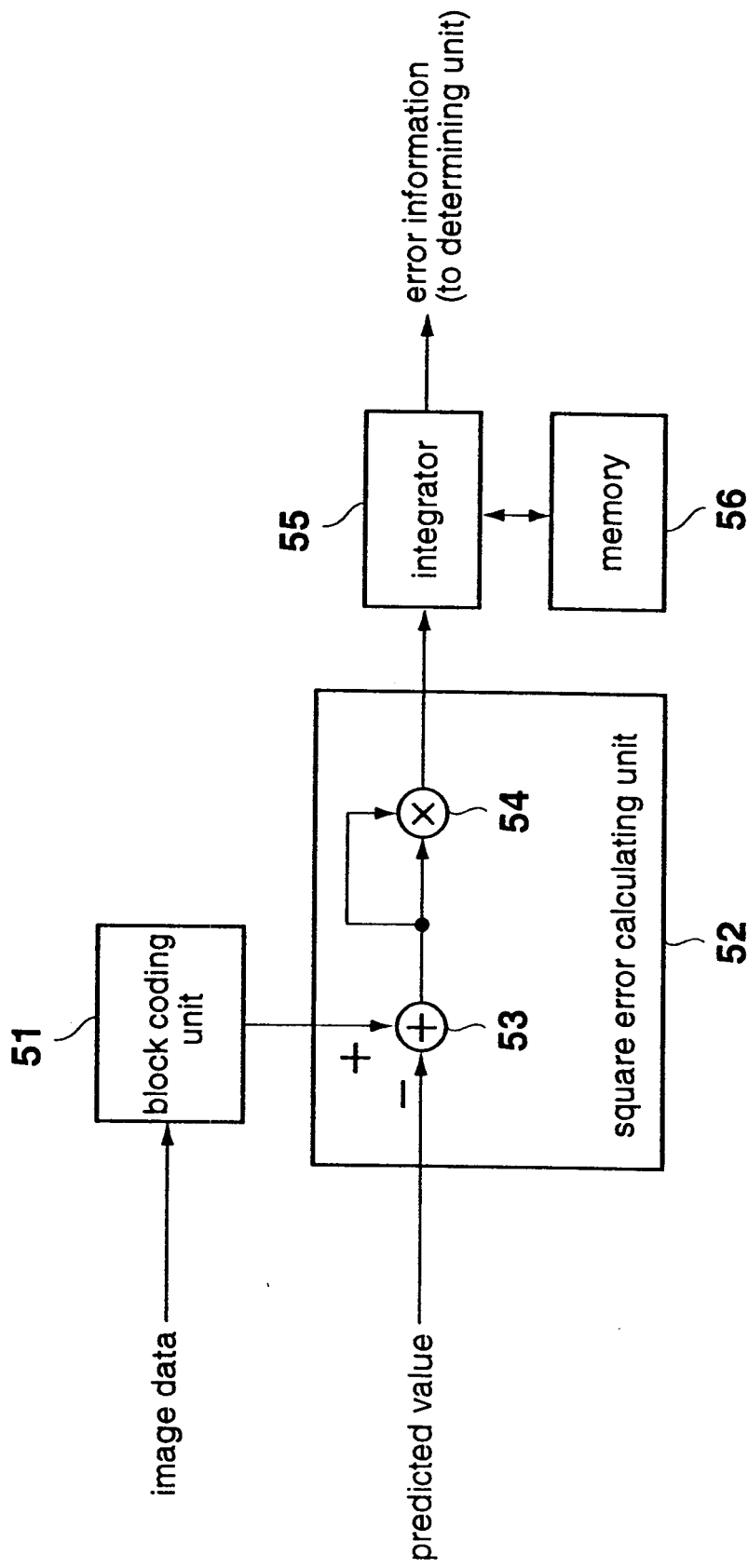
FIG. 12 is a block diagram showing an example configuration of the error calculator 23 of FIGS. 3, 17 and 21.

Next, FIG. 12 shows an example configuration of the error calculator 23 of FIG. 3.

The original image data is supplied to a blocking unit 51. The blocking unit 51 then puts this image data into the form of a block of 9 pixels corresponding to the predicted values for the original image data outputted from the local decoder 22. The resulting 3×3 pixel blocks obtained as a result are then outputted to a square error calculating unit 52. Predicted values for the original image data from the local decoder 22 are also supplied to the square error calculating unit 52 in each block unit of 9 pixels (block units of 3×3 pixels) in addition to the blocks supplied from the block coding unit 51. The square error calculating unit 52 then calculates a square error as the prediction error for the predicted value with respect to the original image data and supplies this to an integrator 55.

The square error calculating unit 52 comprises arithmetic units 53 and 54. The arithmetic unit 53 subtracts corresponding predicted values from image data from the block coding unit 51 that has been put into block form, and these subtracted values are supplied to the arithmetic unit 54. The arithmetic unit 54 then squares the output (the image data for the original image, together with the predicted value and difference) of the arithmetic unit 53 and supplies this to the integrator 55.

When the square error is received from the square error calculating unit 52, the integrator 55 reads the values stored in the memory 56. These stored values and the squared errors are then added, again supplied to the memory 56 and stored, with this process being repeated. The integrated value (error, dispersion) of the square error is therefore obtained. When the integrator 55 then finishes integrating square errors for a prescribed amount (for example, one frame portion, etc.), this integrated value is read from the memory 56 and supplied to the determining unit 24 as error information. When the processing for one frame is complete, the memory 56 clears these stored values while storing the values outputted by the integrator 55.

Figure 13:
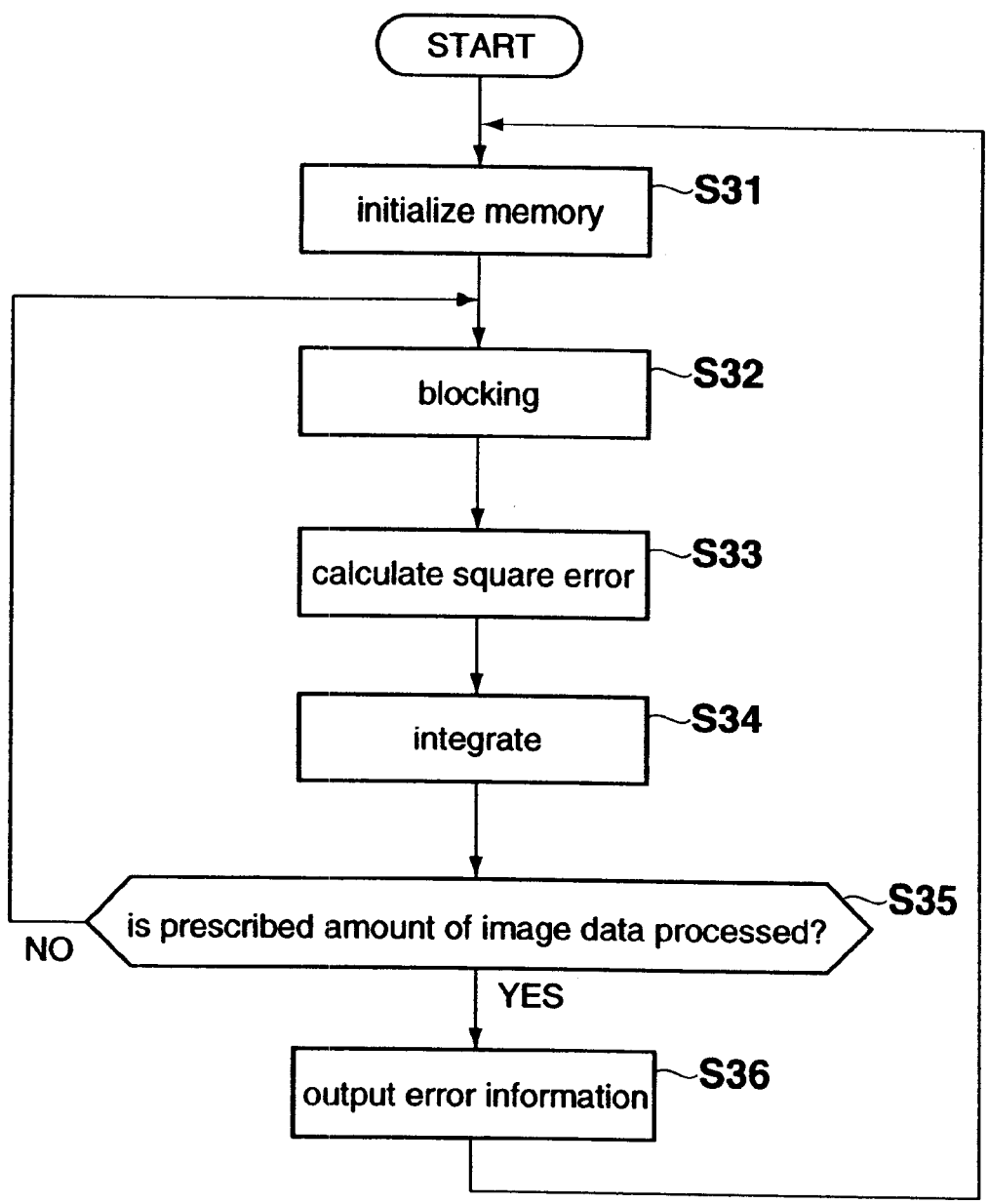
FIG. 13 is a flow chart illustrating the operation of the error calculator 23 of FIG. 12.

Next, this operation will be described with reference to the flow chart of FIG. 13. At the error calculator 23, the value stored in the memory 56 is first, for example, cleared to 0 in step S31 and step S32 is proceeded to. Then, at the block coding unit 51, the image data is put into the form of blocks and the resulting blocks are supplied to the square error calculating unit 52. The square error for the image data for the original image data comprising the blocks supplied from the block coding unit 51 and the predicted values supplied from the local decoder 22 are then calculated in step S33 at the square error calculating unit 52.

Namely, in step S33, at the arithmetic circuit 53, corresponding predicted values are subtracted from the respective image data supplied in block form by the block coding unit 51 and the resulting data is supplied to the arithmetic unit 54. Further, in step S33, the output of the arithmetic unit 53 is squared at the arithmetic unit 54 and supplied to the integrator 55.

When the square error from the square error calculating unit 52 is received, in step S34, the integrator 55 reads the values stored in the memory 56 and obtains integrated values for the square error by adding these stored values and the square errors. The integrated values for the squared errors calculated at the integrator 55 are then supplied to the memory 56 and stored by overwriting the values stored for the previous time.

Next, in step S35, the integrator 55 makes a determination as to whether or not integration of the square errors for a prescribed amount of, for example, one frame portion, is complete. When it is determined in step S35 that integration of the square errors for one frame portion is not complete, step S32 is returned to and the process from step S32 onwards is repeated. Further, when it is determined in step S35 that integration of the square errors for one frame portion is complete, step S35 is proceeded to. The integrator 55 then reads out integration values for square errors for one frame portion stored in the memory 56 and outputs these to the determining unit 24 as error information. Step S31 is then returned to and the process is repeated from step S31 onwards.

The error information Q can then be calculated at the error calculator 23 by carrying out arithmetic operations in accordance with the following equation when the original image data is taken to be Yij(k) and the predicted value is taken to be E[Yij(k)].

$$Q=\Sigma(Y_{ij}(k)-E[Y_{ij}(k)])^2$$

Here, Σ means a summation with respect to one frame portion.

Figure 14:
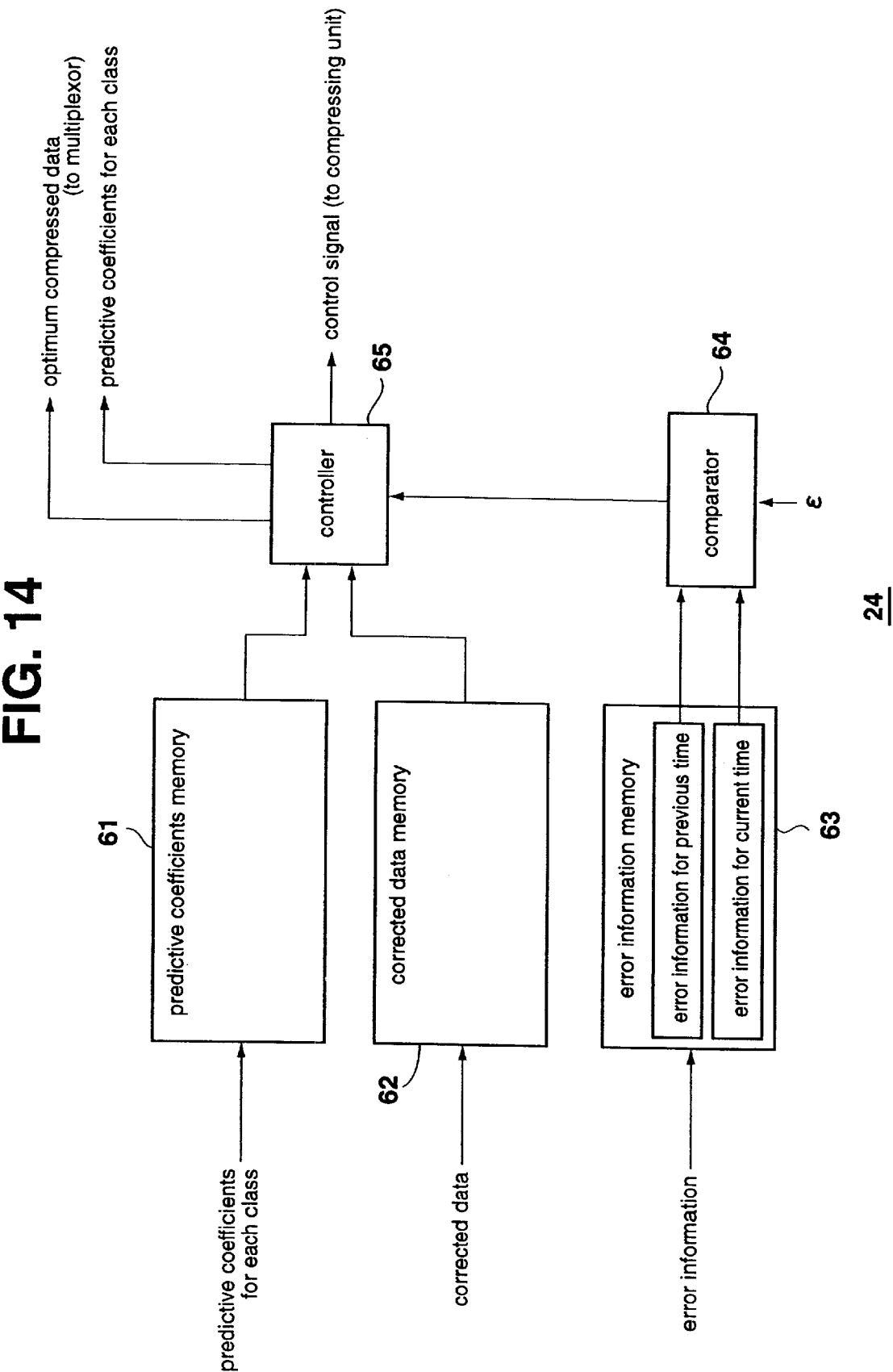
FIG. 14 is a block diagram of the determining unit 24 of FIGS. 3 and 17.

FIG. 14 shows an example configuration of the determining unit 24 of FIG. 3.

The predictive coefficient memory 61 stores predictive coefficients supplied from the local decoder 22. The corrected data memory 62 stores corrected data from the compressing unit 21.

When newly corrected data is supplied by the compressing unit 21, the corrected data memory 62 stores the newly corrected data in place of the corrected data (data corrected the previous time) already stored. In this way a new set of predictive coefficients corresponding to this new corrected data is outputted from the local decoder 22 when corrected data is updated with new data in this way. However, when these new predictive coefficients for each class are also supplied to the predictive coefficient memory 61 these new predictive coefficients for each class are stored in place of the predictive coefficients for each class (predictive coefficients for each class for the previous time) already stored.

An error information memory 63 stores error information supplied from the error calculator 23. As well as storing the error information currently provided from the error calculator 23, the error information memory 63 stores error information supplied the previous time (already stored error information is held until new error information is supplied even if new error information is supplied). The error information memory 63 is then cleared every time processing of new frames commences.

A comparator 64 compares error information for the current time stored in the error information memory 63 and a prescribed threshold value ε, as well as comparing error information for the current time and error information for the previous time if necessary. The comparison results of the comparator 64 are then supplied to a controller 65.

The controller 65 determines whether corrected data stored in the corrected data memory 62 is suitable (most suited) to be taken as original image coding results based on the comparison results of the comparator 64. When the corrected data is confirmed (determined) not to be the most appropriate, a control signal requesting outputting of new corrected data is supplied to the compressing unit 21 (correcting unit 32) (FIG. 5). Further, when the predictive coefficients for each class stored in the predictive coefficient memory 61 is confirmed to be the most suited to be taken as coding results for the original image data, the controller 65 reads out corrected data stored in the corrected data memory 62, outputs this data to the multiplexor 25 to thereby supply to the multiplexor 25 the most suitable corrected data. Further, in this case, the controller 65 outputs a control signal to compressing unit 21 indicating completion of coding for one frame of image, so that processing starts at the compressing unit 21 for the following frame as described above.

Figure 15:
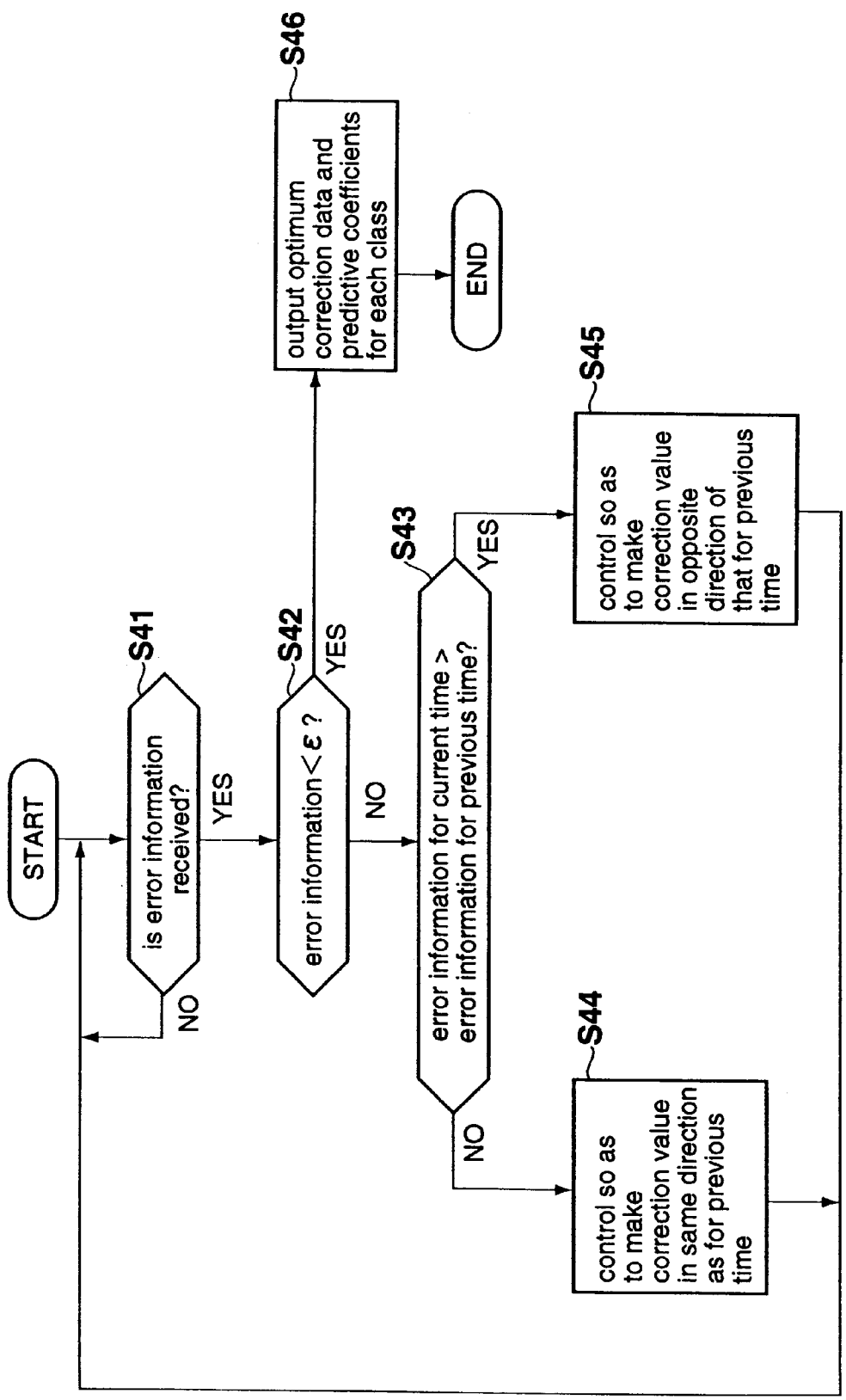
FIG. 15 is a flow chart illustrating the operation of the determining unit 24 of FIG. 14.

Next, a description is given with reference to FIG. 15 of the operation of the determining unit 24. At the determining unit 24, whether or not error information has been received from the error calculator 23 is determined in step S41 by the comparator 64. When it is determined that error information has not been received, step S41 is returned to. When it is determined in step S41 that error information has been received, i.e., that error information is stored at the error information memory 63, step S42 is proceeded to. The comparator 64 then compares the error information currently stored in the error information memory 63 (the current error information) and the prescribed threshold value E and determines which is the larger.

When it is determined in step S42 that the error information for the current time is equal to or greater than the prescribed threshold value $\epsilon$, the comparator 64 reads out error information for the previous time stored in the error information memory 63. The comparator 64 then compares the error information for the previous time and the error information for the current time in step S43 and determines which is larger.

When processing is then started for one frame and error information is first provided, the error information for the previous time is not stored in the error information memory 63. Therefore, in this case, the processing from step S43 onwards is not carried out at the determining unit 24. A control signal for controlling the correcting unit 32 (FIG. 5) is then outputted and a prescribed initial address is outputted.

When it is determined in step S43 that the current error information is less than the error information for the previous time, i.e., when the error information is reduced by carrying out correction of compressed data, step S44 is proceeded to. The controller 65 then outputs a control signal indicating that a correction value $\Delta$ is to be changed in the same way as for the previous time to the correcting unit 32 and step S41 is returned to. Further, when it is determined in step S43 that the error information for the current time is larger than the error information for the previous time i.e., when the error information is increased by carrying out correction of compressed data, step S45 is proceeded to, the controller 65 outputs a control signal indicating that the correction value $\Delta$ has been changed in a way that is the opposite of that for the previous time to the correcting unit 32 and step S41 is returned to.

When error information that continues to be reduced rises at a certain timing, the controller 65 outputs a control signal indicating that the corrected value $\Delta$ is to be changed in a manner opposite to that of the previous time to, for example, ½ the size of the case up until that point in time.

The error information is then reduced by repeating the process of step S41 to S45. In this way, when the error information of the current time is determined in step S42 to be smaller than the prescribed threshold value, step S46 is proceeded to. The controller 65 then reads corrected data stored in the corrected data memory 62 and the predicted values for the original image data is supplied to the multiplexor 25 as the most suitable corrected data present in the optimum data. In step S46, the controller 65 reads predictive coefficients for each class stored in the predictive coefficient memory 61 and corrected data of 1 frame stored in the corrected data memory 62, supplies this data to the multiplexor 25 and the processing is complete.

After this, the error information for the following frame is awaited and the process is repeated in accordance with the flow chart shown in FIG. 15.

At the correcting unit 32, the correction for the image data for the original image data can also be carried out for all of the image data for the original image data of one frame and can also be carried out just with respect to data for this one portion. When correction is carried out only with respect to this one portion, for example, pixels that strongly influence the error information are detected by the controller 65, with correction then only being carried out for these pixels. Pixels that strongly influence the error information can be detected, for example, in the following way. Namely, first, error information can be obtained by carrying out processing using the compressed data of pixels remaining after thinning-out as is. Error information (1) resulting from the outputting of a control signal that causes processing that performs correction for just the same correction value $\Delta$ one pixel at a time to be performed on compressed data for pixels remaining after thinning-out, and (2) error information obtained when the compressed data is used without modification are compared. Pixels for which this difference is greater than or equal to a prescribed value can then be detected as pixels that strongly influence the error information.

Correction of the image data for the original image data is then repeated until the error information becomes smaller (made to be equal to or less than) than the prescribed threshold value $\epsilon$. The corrected data, when the error information becomes smaller than the prescribed threshold value $\epsilon$, is then outputted as the optimum corrected data. It is therefore possible to obtain a decoded image at the receiving apparatus 4 (FIG. 1) that is the same as (almost the same as) the source image data using this optimum corrected data, i.e. just the corrected data for the value that is the most suited to decoding the image for the original image data.

In addition to compression by thinning-out, the image is compressed by ADRC processing and class classifying adaptive processing etc. and coded data of an extremely high compression rate can therefore be obtained. The above coding processing occurring at the transmission apparatus 1 achieve highly efficient compression by using so-called organic combining of compression coding using thinning-out and class classifying adaptive processing, with this being referred to as combined code processing.

Figure 16:
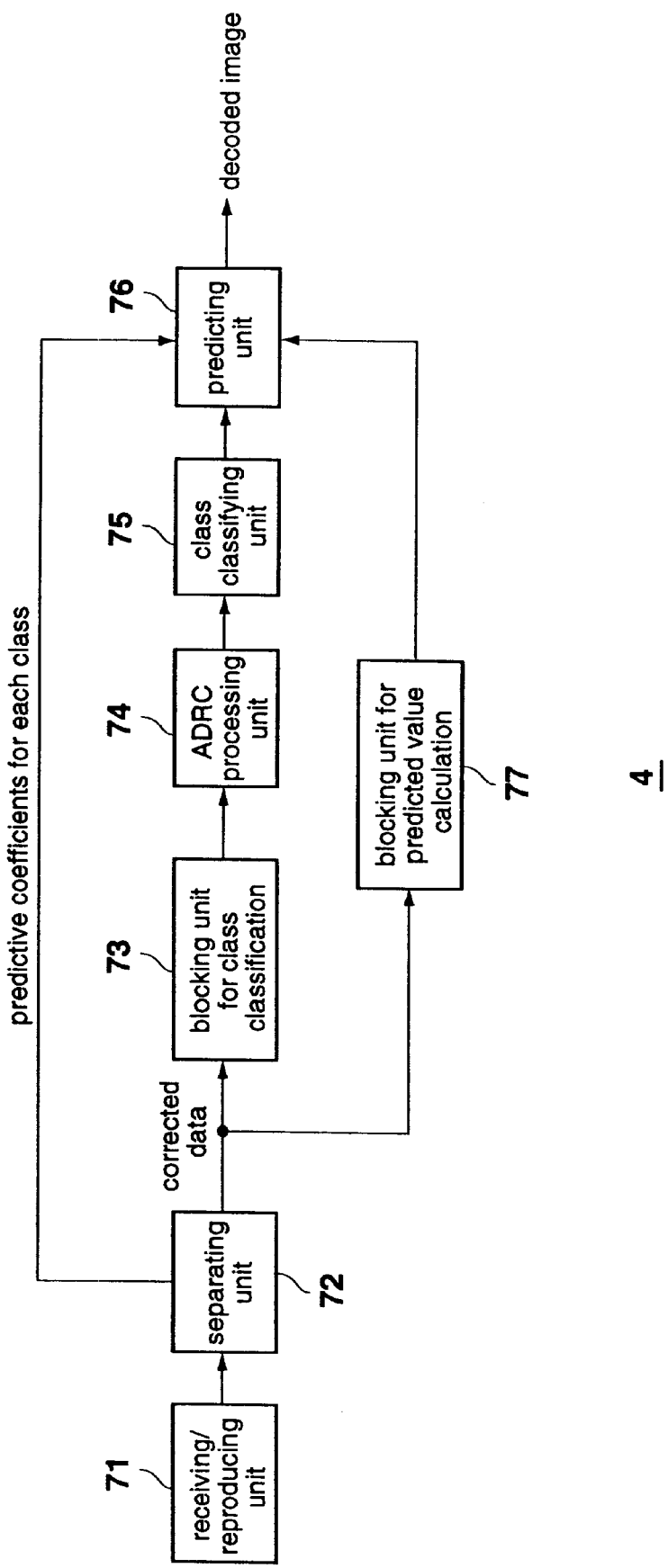
FIG. 16 is a block diagram of the receiving apparatus 4 of FIG. 1 for use in connection with the transmitting apparatus of FIGS. 3 and the transmitting apparatus of FIG. 17.

With reference now to FIG. 16, a first embodiment of a decoder is explained in detail.

At the receiving/reproducing device 71, coded data recorded on the recording medium 2 is played-back or coded data transmitted via a transmission path 3 is received and supplied to a divider 72. The divider 72 then divides the coded data into corrected data and predictive coefficients for each class. The corrected data is then supplied to a blocking unit for class classification 73 and a blocking unit 77 for predicted value calculation 77 and the predictive coefficients for each class are supplied to the predicting unit 76 and then are stored in a memory (not shown) for example.

The blocking unit for class classification 73, an ADRC processing unit 74, a class classifying unit 75 and a blocking unit for predicted value calculation 77 have the same configuration as the blocking unit for class classification 41, the ADRC processing unit 44, the class classifying unit 45 and a blocking unit for predicted value calculation 42. The same processes as for the case in FIG. 8 are therefore carried out on these blocks so that blocks for predicted value calculation are outputted from the blocking unit for predictive value calculation 77 and class information is outputted from the class classifying unit 75. The blocks for predicted value calculation and the class information is then supplied to the predicting unit 76.

3×3 predicted values are calculated at the predicting unit 76 in accordance with equation (1) using predictive coefficients corresponding to the class information and corrected data comprising 5×5 pixel blocks for predicted value calculation supplied from the blocking unit for predicted value calculation 77. Images for one frame comprised using these kind of predicted values are then outputted as the decoded image.

On the receiving side, a decoded image can be obtained by carrying out usual interpolation without using predictive coefficients even without the receiving apparatus 4 shown in FIG. 16 by using a apparatus that decodes by performing simple interpolation of the thinned-out image. However, the picture quality (resolution) of decoded images obtained in this case is inferior.

In the above case, predictive coefficients are obtained at the local decoder 22 of FIG. 3 and are used to obtain predicted values. However, it is also possible to calculate predicted values at the local decoder 22 without obtaining predictive coefficients.

Figure 17:
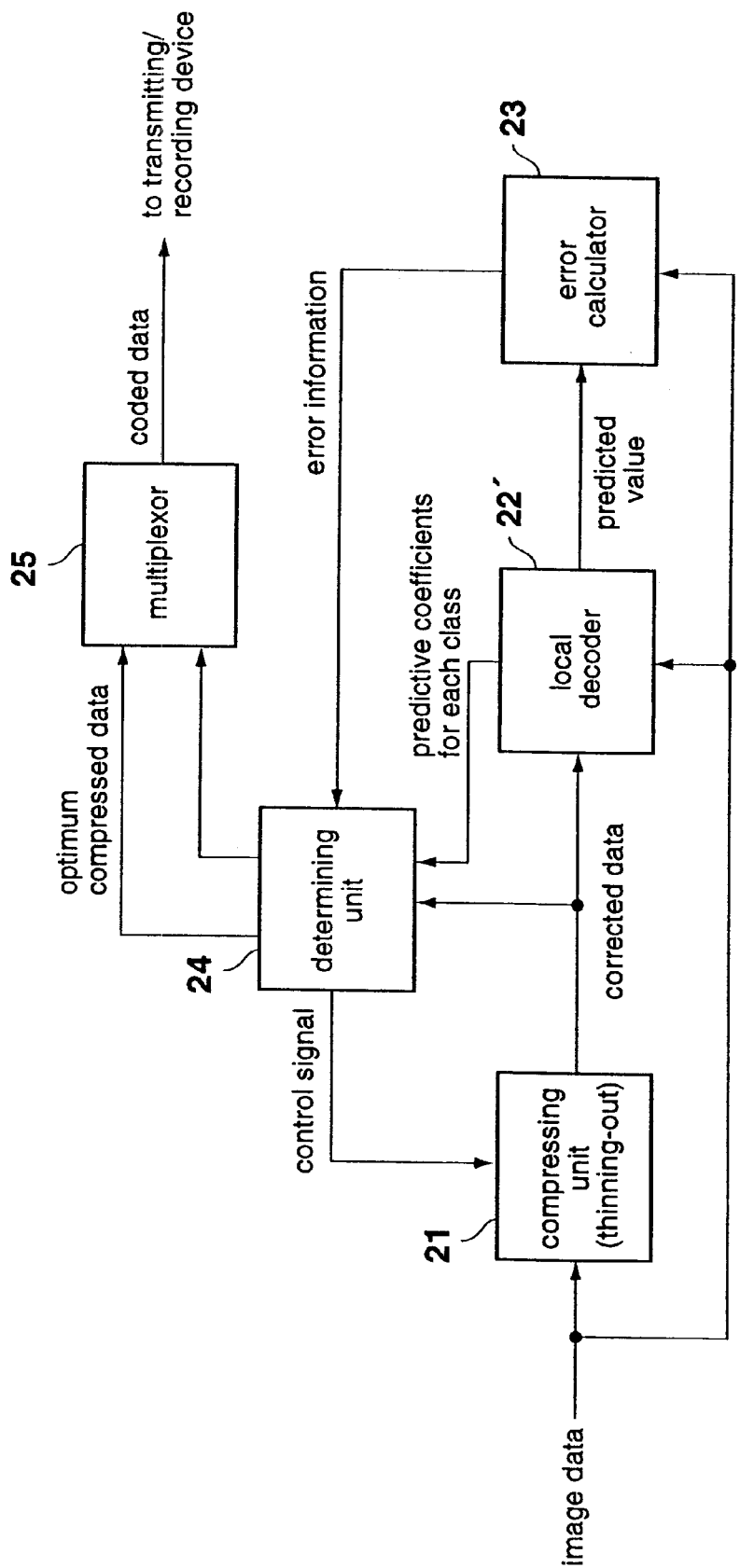
FIG. 17 is a block diagram of a transmission apparatus of a second embodiment of the present invention.
Figure 18:
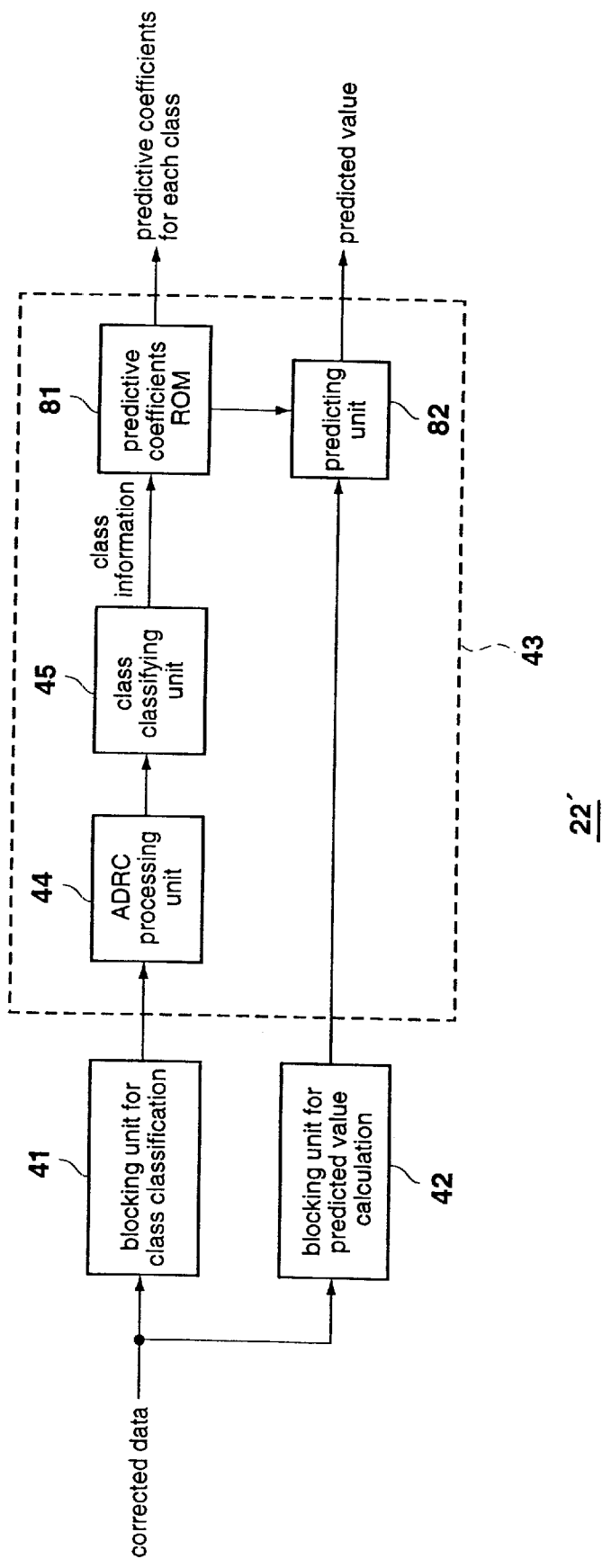
FIG. 18 is a block diagram of the local decoder 22' of FIG. 17.

With reference now to FIGS. 4, 5, 6, 12, 13, 14, 15, 16, 17, 18, 19 and 20, a second embodiment of a transmission apparatus 1 (excluding the transmitting/recording device 16) and a receiving apparatus 4 is explained. Referring now to FIG. 17, such FIG. 17 illustrates a second embodiment of a transmission apparatus. In contrast to the transmission apparatus of FIG. 3, the transmission apparatus of FIG. 17 utilizes a different local decoder. More specifically, the local decoder 22 of FIG. 3 is replaced with a local decoder 22' as shown in FIG. 18. In further detail, FIG. 18 is a block diagram of the local decoder 22' of FIG. 17. In FIG. 18, portions that correspond to portions in local decoder 22 of FIG. 8 are given the same numerals. This is to say that other than predictive coefficients ROM 81 and a predicting unit 82 being provided in place of the adaptive processing unit 46, the configuration of the local decoder 22' of FIG. 18 is the same as the local decoder 22 of FIG. 8.

The predictive coefficients ROM 81 stores predictive coefficients for each class that have already been obtained by learning (to be described later), receives class information outputted by the ADRC processing unit 44, reads predictive coefficients stored in addresses corresponding to this class information, and supplies this data to the predicting unit 82. Predictive coefficients ROM 81 also outputs to determining unit 24 (of FIG. 17) predictive coefficients for each class At the predicting unit 82 the linear first-order equation shown in equation (1) (specifically, for example, equation (8)) using 5×5 pixel blocks for predicted value calculation from the blocking unit for predicted value calculation 42 and predictive coefficients from the predictive coefficients ROM 81, predicted values for the original image data can be calculated.

Therefore, according to the class classifying adaptive processing circuit 43 of FIG. 18, these predictive values can be calculated without using original image data. It is possible to store the mean values of the pixel values comprising the teaching blocks at addresses corresponding to each class at the predictive coefficients ROM 81 rather than storing the actual predictive coefficients. In this case, when the class information is considered, pixel values corresponding to this class are outputted. The local decoder 22 of FIG. 18 in such an embodiment does not include the blocking unit for predicted value calculation 42 nor the predicting unit 82.

Figure 19:
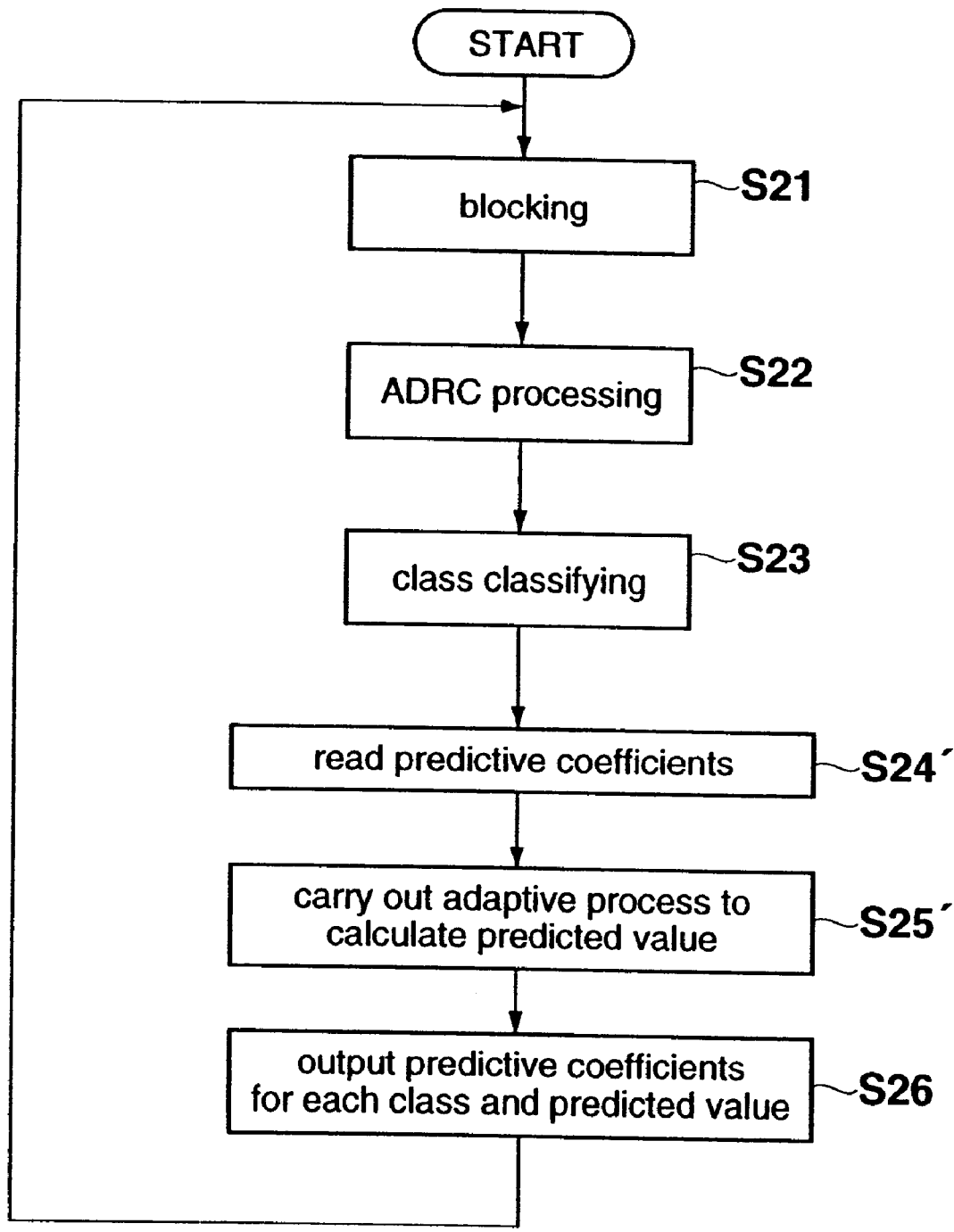
FIG. 19 is a flow chart illustrating the operation of the local decoder of FIG. 18.

Referring now to FIG. 19, the operation of local decoder 22' of FIG. 18 is explained in further detail. As with the local decoder of FIG. 8, in step S21, the local decoder 22' puts corrected data from the compressing unit 21 into the form of blocks. Namely, at the blocking circuit for class classification 41, the corrected data is put into the form of 3×3 pixel blocks centered about the noted corrected data for class classifying use and supplied to the class classifying adaptive processing circuit 43. Further, at the blocking unit for predicted value calculation 42, the corrected data is put into the form of a 5×5 pixels block centered about the noted corrected data for predicted value calculation and supplied to the class classifying adaptive processing circuit 43.

The blocks for class classifying use are supplied to the ADRC processing unit 44 and the blocks for predicted value calculation are supplied to the predicting unit 82.

In step S22, when the blocks for class classification are received, the ADRC processing unit 44 subjects the blocks for class classification use to, for example, one bit ADRC (ADRC carried out using one bit quantization) processing so that the corrected data is converted (coded) into one bit and outputted to the class classifying unit 45. In step S23, the class classifying unit 45 subjects the blocks for class classification that have been ADRC processed to class classifying processing. Namely, the class classifying unit 45 detects a state of distribution of each of the levels in the block and determines the classes that these class classifying blocks belong to. The results of this class determination are then supplied to the adaptive processing unit 46 as class information.

In this embodiment, each of the blocks for class classification belong to one of the 512 (=(21)9) classes because class classifying dividing has been carried out on the blocks for class classification comprising 9 pixels arranged as 3×3 that have undergone one-bit ADRC processing.

Step S24' is then proceeded to and at such step predictive coefficients are read for each class. At step S25' adaptive processing is carried out to calculate predicted values for each class. Then at step S26 predictive coefficients for each class and predicted values are output. Step S21 is then returned to and the same process is repeated thereafter, for example, for each one frame.

Figure 20:
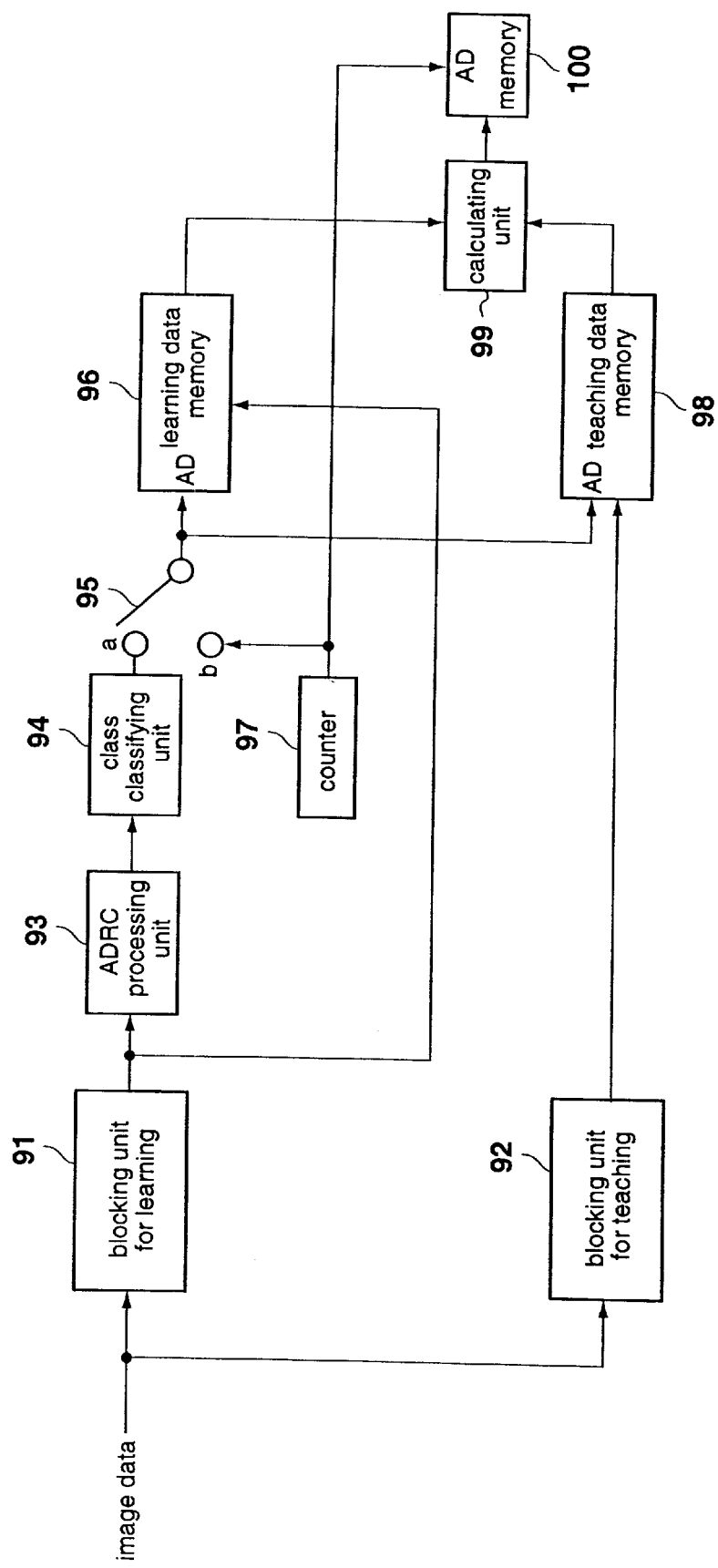
FIG. 20 is a block diagram showing a configuration of an embodiment of an image processing apparatus for calculating predictive coefficients for storage in the predictive coefficients ROM 81 of FIG. 18.

Next, FIG. 20 shows an example configuration of an image processing apparatus for carrying out learning for obtaining predictive coefficients for each class stored in the predictive coefficients ROM 81 of FIG. 18.

Image data (learning images) for learning use for obtaining predictive coefficients suitable for all images are supplied to a blocking unit for learning 91 and a blocking unit for teaching 92. Such image data is selected beforehand to be representative of data to be produced, i.e., to be representative of the types of scenes, motion, visual impact, etc.

The blocking unit for learning use 91 extracts 25 pixels (5×5 pixels) of the positional relationship shown, for example, by the mark • in FIG. 7 from the inputted image data. The blocks comprising these 25 pixels is then supplied to an ADRC processing unit 93 and a learning data memory 96.

At the blocking unit for teaching 92 a block comprising, for example, nine pixels arranged as 3×3 is generated from the inputted image data. The block comprising these 9 pixels is then supplied to a teaching data memory 98 as a block for teaching.

When a block for learning comprising 25 pixels of the positional relationship shown, for example, by the mark • in FIG. 7 is generated at the blocking unit for learning 91, a 3×3 pixel block for learning shown as being surrounded by the quadrilateral in FIG. 7 is generated at the blocking unit for teaching 92.

The ADRC processing unit 93 extracts the center 9 pixels (3×3 pixels) from the 25 pixels comprising the block for learning use, with one-bit ADRC processing then being performed on this nine pixels block in the same way as the case for the ADRC processing unit 44 of FIG. 18. The ADRC-processed 3×3 pixels block is then supplied to a class classifying unit 94. Blocks from the ADRC processing unit 93 are class-classified at the class classifying unit 94 in the same way as the case for the class classifying unit 45, with the class information obtained being sent to the learning data memory 96 and the teaching data memory 98 via terminal a of switch 95.

Blocks for learning use from the blocking unit for learning 91 and blocks for teaching use from the blocking unit for teaching 92 are stored at addresses corresponding to the provided class information at the learning data memory 96 and the teaching data memory 98, respectively.

At the learning data memory 96, when, for example, the block comprising 5×5 pixels shown by the mark • in FIG. 7 is taken as the block for learning use and stored at a certain address, the 3×3 pixels block shown to be surrounded by the quadrilateral in FIG. 7 is stored as the block for teaching use at the same address as this address at the teaching data memory 98.

The same process is then repeated for all of the images for learning use prepared beforehand. In this way, the block for learning use and the block for teaching use comprising 9 pixels for which predicted values are obtained at the local decoder 22 of FIG. 17 using blocks for predicted value calculation comprising 25 items of corrected data having positional relationships that are the same as the 25 pixels comprising this block for learning are stored at the same addresses of the learning data memory 96 and the teaching data memory 98.

A plurality of information can be stored at the same address at the learning data memory 96 and the teaching data memory 98. In this way, it is possible to store a plurality of blocks for learning and blocks for teaching at the same address.

When the blocks for learning and blocks for teaching for all of the images for learning are stored in the learning data memory 96 and the teaching data memory 98, the switch 95 selecting terminal a is switched over to terminal b. The output of a counter 97 is then supplied to the learning data memory 96 and the teaching data memory 98 as the address. The counter 97 counts a prescribed clock and outputs this count value. The blocks for learning and the blocks for teaching stored at the addresses corresponding to this count value are then read from the learning data memory 96 and the teaching data memory 98 and supplied to a calculating unit 99.

A set for the block for learning and a set for the block for teaching corresponding to a certain class in accordance with the count value of the counter 97 are then supplied to the calculating unit 99.

The calculating unit 99 receives the set for the block for learning and the set for the block for teaching for a certain class and calculates predictive coefficients for a certain class that makes the error a minimum using the least square method.

For example, when the pixel values of the pixels comprising the blocks for learning are taken to be $x_1, x_2, x_3, \ldots$ and the predictive coefficients to be obtained are taken to be $w_1, w_2, w_3, \ldots$, blocks for learning use are configured using linear first order coupling and in order to obtain a pixel value y for a certain pixel it is necessary for the predictive coefficients $w_1, w_2, w_3, \ldots$ to fulfill the following equation.

$$Y = w_1 x_1 + w_2 x_2 + w_3 x_3 + \ldots$$

At the calculating unit 99, predictive coefficients $w_1, w_2, w_3, \ldots$ that make the square error for the predicted values $w_1 x_1 + w_2 x_2 + w_3 x_3 + \ldots$ from blocks for learning of the same class and corresponding blocks for teaching a minimum with respect to the true value y by resolving the regular equation shown in equation (7).

The predictive coefficients obtained at the calculating unit 99 for each class are supplied to the memory 100. In addition to the predictive coefficients from the calculating unit 99, count values are also supplied to the memory 100 so that predictive coefficients from the calculating unit 99 can be stored at addresses corresponding to count values from the counter 97. Therefore, 25×9 predictive coefficients for each class are calculated by carrying out the process as above for each class.

The most appropriate predictive coefficients (here, this is the 25×9 predictive coefficients) for predicting 3×3 pixel blocks of this class are stored at addresses corresponding to each class at the memory 100.

In the first embodiment, the predictive coefficients for each class are calculated in real time in the local decoder, and the predictive coefficients for each class stored at the memory 100 are stored at the predictive coefficients ROM 81 of FIG. 18. In the second embodiment, since in the local decoder predictive coefficients for each class are not calculated, it is possible to raise processing speed. In a third embodiment, since predictive coefficients for each class are not transferred, it is possible to raise the efficiency of compressing.

With reference now to FIGS. 5, 6, 12, 13, 21, 22, 23, 24, 25, 26 and 27 the third embodiment of the transmitting apparatus 1 (excluding the transmitting/recording device 16) and the receiving apparatus 4 is explained. In further detail, referring to FIG. 21, the transmission apparatus of FIG. 21 differs from that of FIG. 17 with respect to a local decoder 22" and with respect to a determining unit 24'. More specifically, the local decoder 22" does not, as does the local decoder 22' of FIG. 19, provide predictive coefficients for each class. Furthermore, as would be expected given the output of local decoder 22", the determining unit 24' of FIG. 21 outputs optimum compressed data, but does not output predictive coefficients. Therefore, the output data of determining unit 24 need not be multiplexed (with coefficient data) before transmission or recording of such output data.

Figure 21:
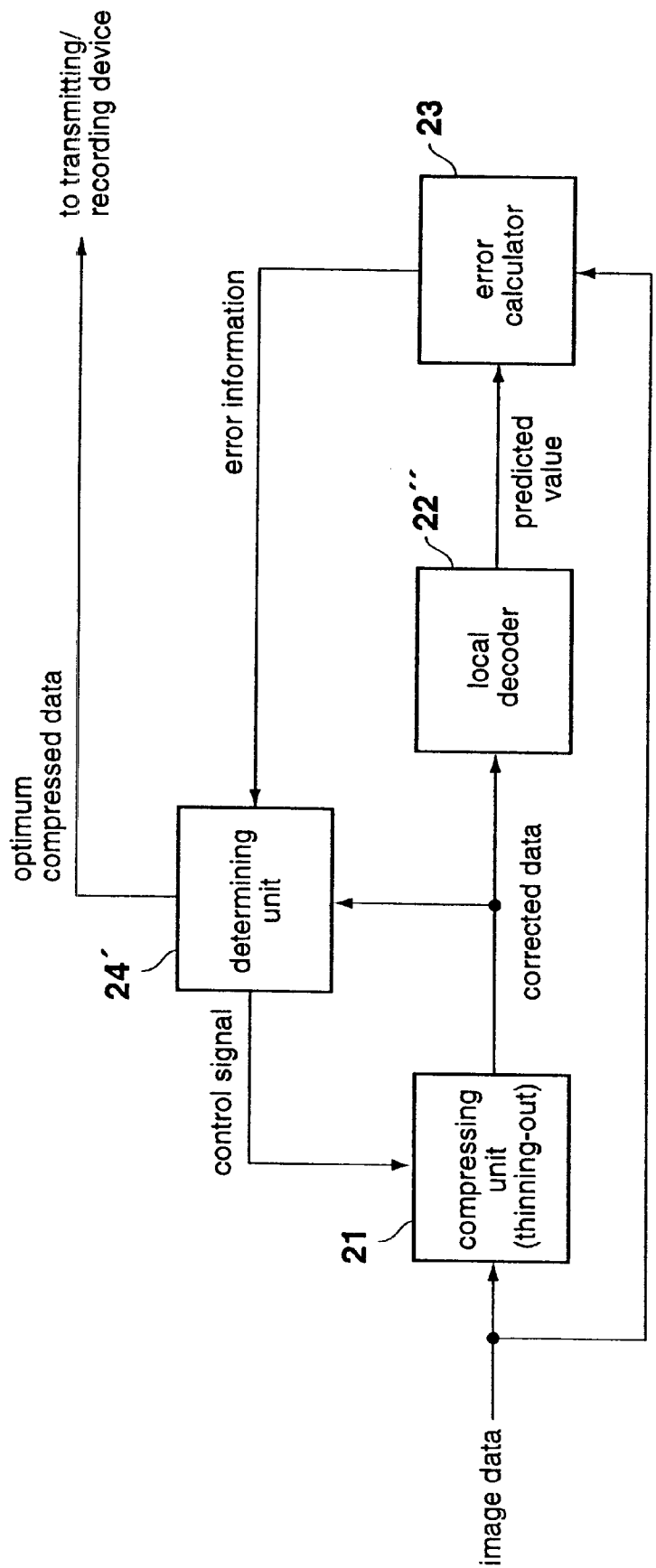
FIG. 21 is a block diagram of a transmission apparatus of a third embodiment of the present invention.
Figure 22:
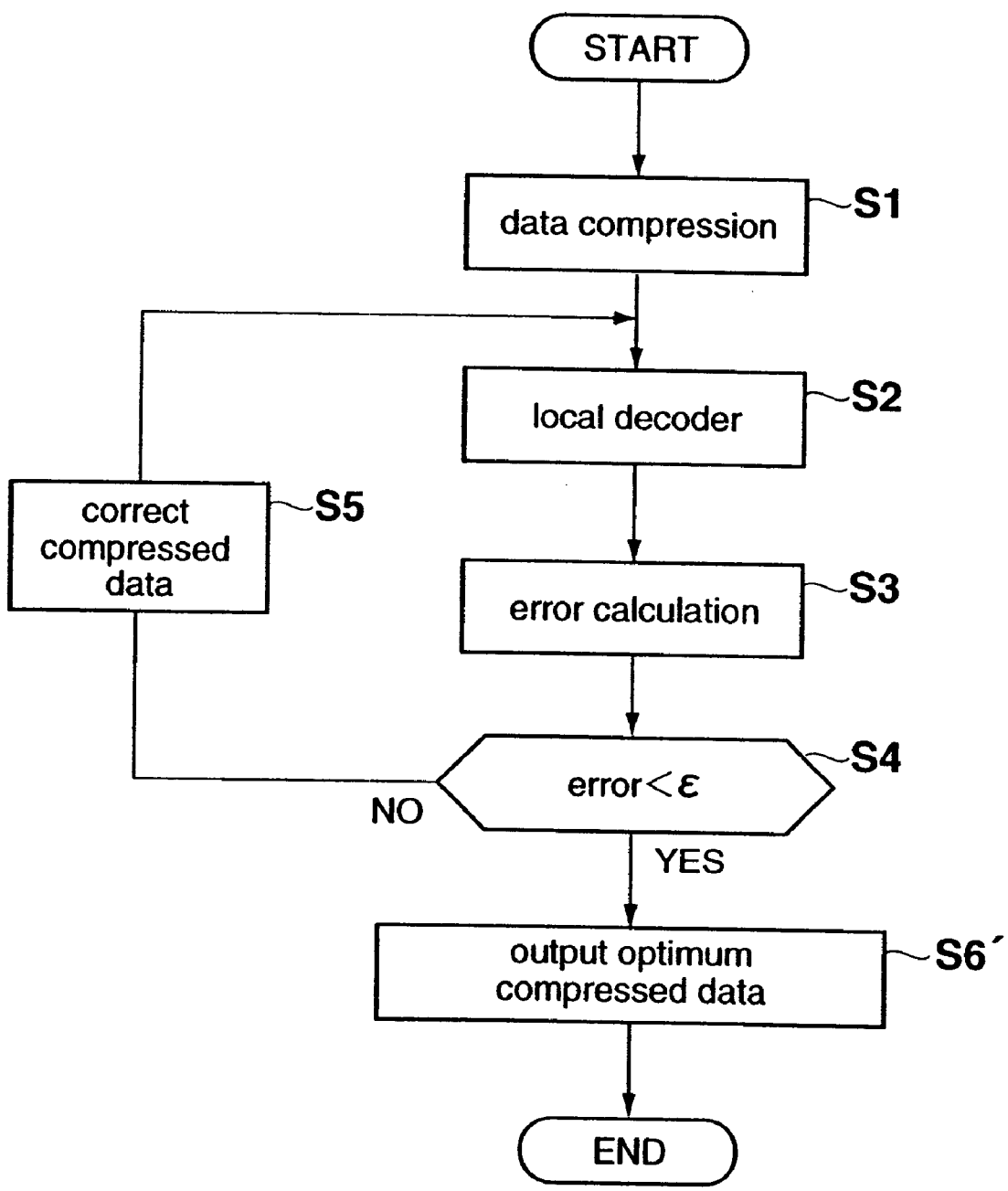
FIG. 22 is a flow chart illustrating the operation of the transmission apparatus of FIG. 21.

Referring now to FIG. 22, the operation of the transmission apparatus of FIG. 21 is explained in further detail. When image data is supplied to the compressing unit 21, in step S1 the compressing unit 21 performs compression by thinning-out (subsampling) this image data and first outputs this image data to the local decoder 22" and the determining part 24' without carrying out correction. Corrected data (initially this is compressed data where the image data has simply been thinned-out) is locally decoded at the local decoder 22' in step S2.

Namely, in step S2, the predicted values generated by the local decoder 22" are then supplied to the error calculator 23.

Figure 27:
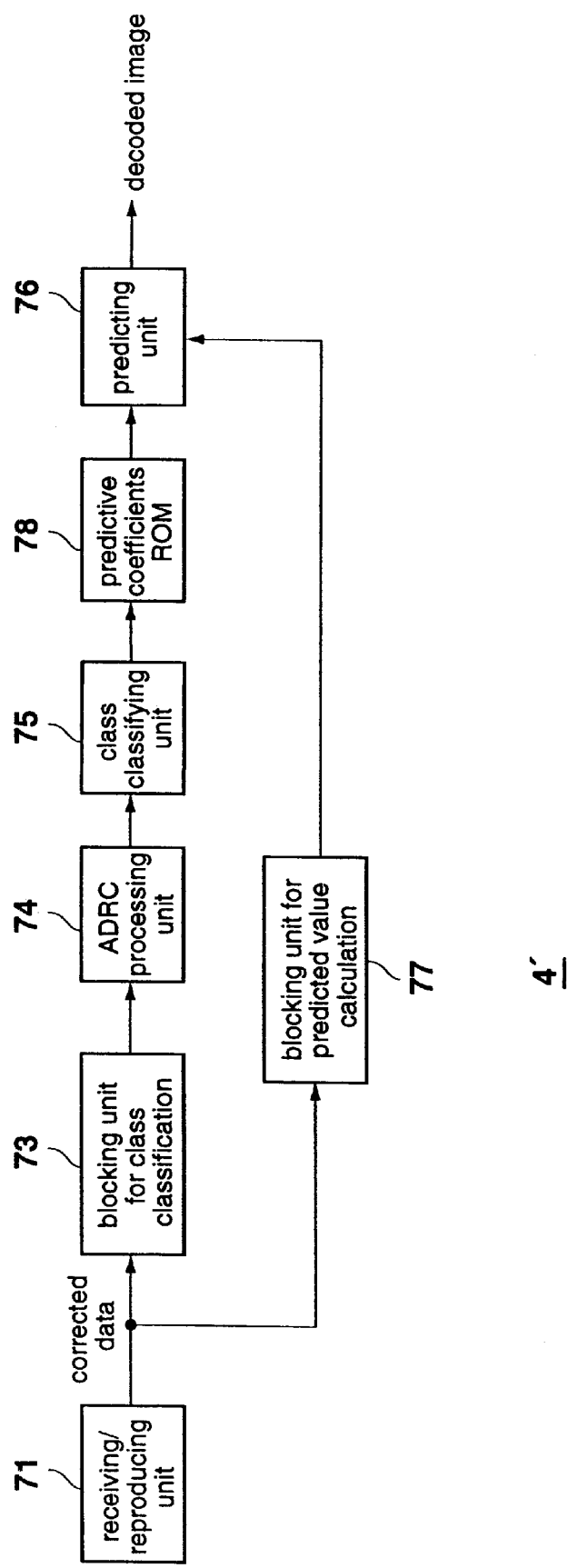
FIG. 27 is a block diagram of a receiving apparatus for use with the transmitting apparatus of FIG. 21.

Images comprised of the predictive values outputted from the local decoder 22" are the same as the decoded images obtained on the side of the receiving apparatus 4' (FIG. 27).

When predictive values for the original image are received from the local decoder 22", the error calculator 23 calculates prediction errors for the predicted values from the local decoder 22" in step S3 with respect to the original image data and supplies these prediction errors to the determining unit 24' as error information. When error information is received from the error calculator 23, in step S4, the determining unit 24' determines whether or not the corrected data outputted by the compressing unit 21 is suitable to be taken as the coding results for the original image based on this error information.

Namely, in step S4 a determination is made as to whether or not the error information is less than the prescribed threshold value $\epsilon$. When it is determined in step S4 that the error information is not less than the prescribed threshold value $\epsilon$, the corrected data outputted by the compressing unit 21 is confirmed to be inappropriate as the coded data for the original image data, step S5 is proceeded to and the determining unit 24' controls the compressing unit 21 so that the compressed data is corrected. The compressing unit 21 then changes the correction amount (hereinafter referred to as the corrected value $\Delta$) under the control of the determining unit 24', the compressed data is corrected and the resulting corrected data is outputted to the local decoder 22" and the determining unit 24. Step S2 is then returned to and the same process is then repeated thereafter.

On the other hand, when it is determined in step S4 that the error information is less than the prescribed threshold value $\epsilon$, the corrected data outputted by the compressing unit 21 is confirmed to be suitable as the coding results for the original image data. The determining unit 24' then at step S6' outputs, for transmission or recording, the corrected data for the case where the error information is less than the prescribed threshold value $\epsilon$ is complete.

As described above, corrected data corrected from the compression data when the error information is less the prescribed threshold $\epsilon$ is taken as the coded results for the original image data. An image that is almost the same as the original image data (source image data) can then be obtained on the side of the receiving apparatus 4' based on this corrected data.

Figure 23:
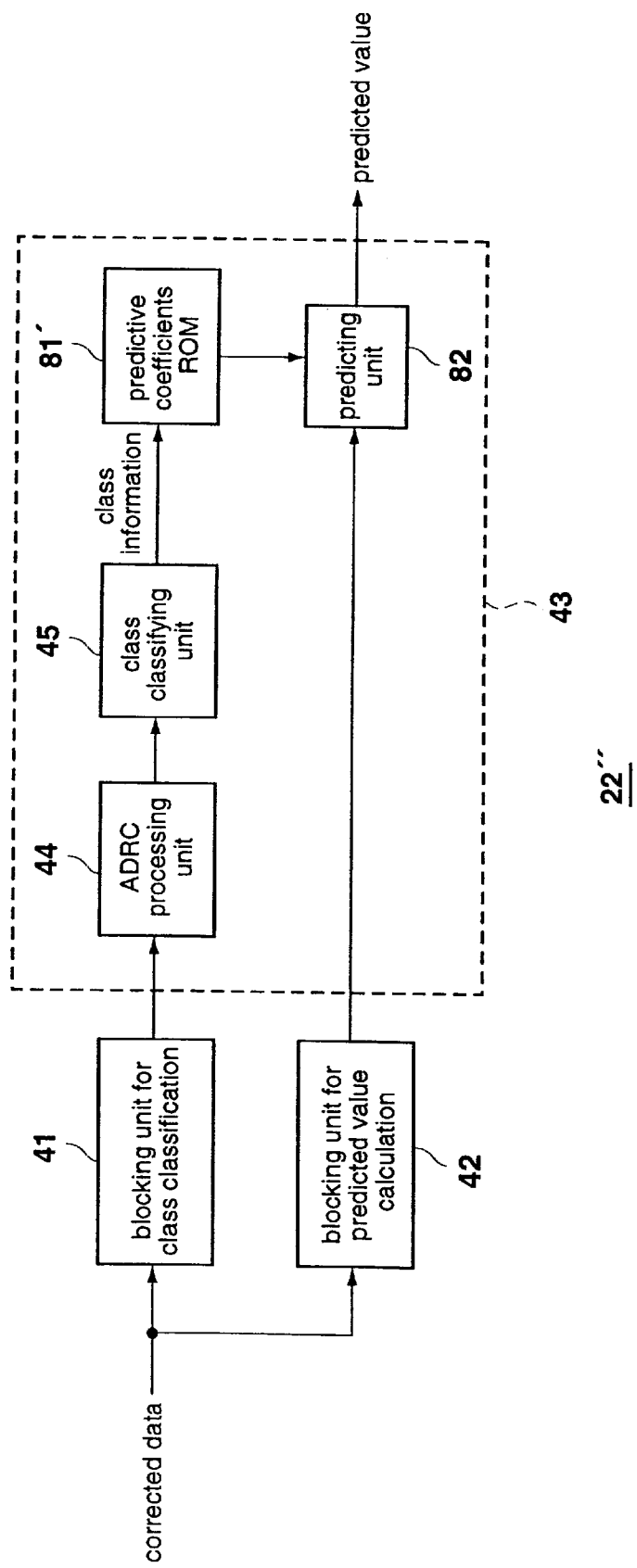
FIG. 23 is a block diagram of a local decoder 22" of FIG. 21.

Referring now to FIG. 23, the local decoder 22" of the third embodiment is explained. In local decoder 22" a predictive coefficients ROM 81' replaces the predictive coefficients ROM 81 of the second embodiment. Since the local decoder 22" does not (as does the local decoder 22' of the second embodiment) generate predictive coefficients for each class, such predictive coefficients are not output from the predictive coefficients ROM 81, but instead are provided only to the predicting unit 82. In further detail, portions that correspond to portions in local decoder 22 of FIG. 8 are given the same numerals. This is to say that other than predictive coefficients ROM 81 and a predicting unit 82 being provided in place of the adaptive processing unit 46, the configuration of the local decoder 22' of FIG. 19 is the same as the local decoder 22 of FIG. 8.

The predictive coefficients ROM 81' stores predictive coefficients for each class that have already been obtained by learning (to be described later), receives class information outputted by the ADRC processing unit 44, reads predictive coefficients stored in addresses corresponding to this class information, and supplies this data to the predicting unit 82.

At the predicting unit 82 the linear first-order equation shown in equation (1) (specifically, for example, equation (8)) using 5×5 pixel blocks for predicted value calculation from the blocking circuit for predicted value calculation 42 and predictive coefficients from the predictive coefficients ROM 81 predicted values for the original image data can be calculated. Therefore, according to the class classifying adaptive processing circuit 43 of FIG. 23, these predicted values can be calculated without using original images.

Figure 24:
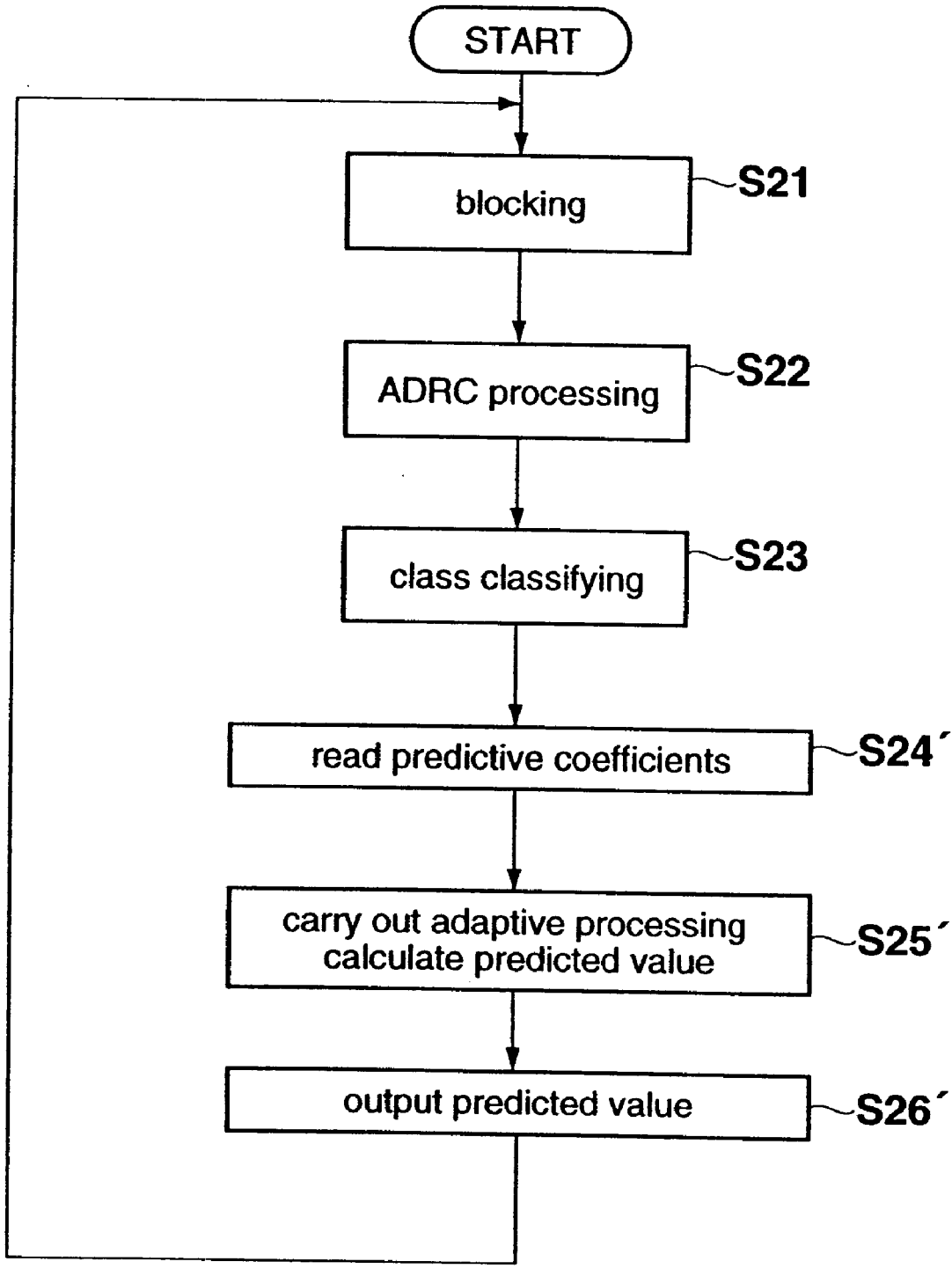
FIG. 24 is a flow chart illustrating the operation of the local decoder of FIG. 23.

Referring now to FIG. 24, the operation of the local decoder 22" of FIG. 23 is explained. As with the local decoder of FIG. 8, in step S21, the local decoder 22" puts corrected data from the compressing unit 21 into the form of blocks. Namely, at the blocking unit for class classification 41, the corrected data is put into the form of 3×3 pixels blocks centered about the noted corrected data for class classification and supplied to the class classifying adaptive processing circuit 43. Further, at the blocking circuit for predicted value calculation 42, the corrected data is put into the form of 5×5 pixel blocks centered about the noted corrected data for predictive value calculation and supplied to the class classifying adaptive processing circuit 43.

The blocks for class classification are supplied to the ADRC processing circuit 44 and the blocks for predicted value calculation use are supplied to the adaptive processing circuit 46.

In step S22, when the blocks for class classification are received, the ADRC processing unit 44 subjects the blocks for class classification to, for example, one bit ADRC (ADRC carried out using one bit quantization) processing so that the corrected data is converted (coded) into one bit and outputted to the class classifying unit 45. In step S23, the class classifying unit 45 subjects the blocks for class classification that have been ADRC processed to class classifying processing. Namely, the class classifying unit 45 detects a state of distribution of each of the levels in the block and determines the classes that these class classifying blocks belong to. The results of this class determination are then supplied to the adaptive processing unit 46 as class information.

In this embodiment, each of the blocks for class classification belong to one of the 512 (=(21)9) classes because class classifying dividing has been carried out on the blocks for class classifying comprising 9 pixels arranged as 3×3 that have undergone one-bit ADRC processing.

Step S24' is then proceeded to and at such step predictive coefficients are read in response to the provided class information. At step S25' adaptive processing is carried out to calculate predicted values. Then at step S26' predicted values are output. Unlike the local decoder of FIG. 17, predictive coefficients are not output. Step S21 is then returned to and the same process is repeated thereafter, for example, for each one frame.

Figure 25:
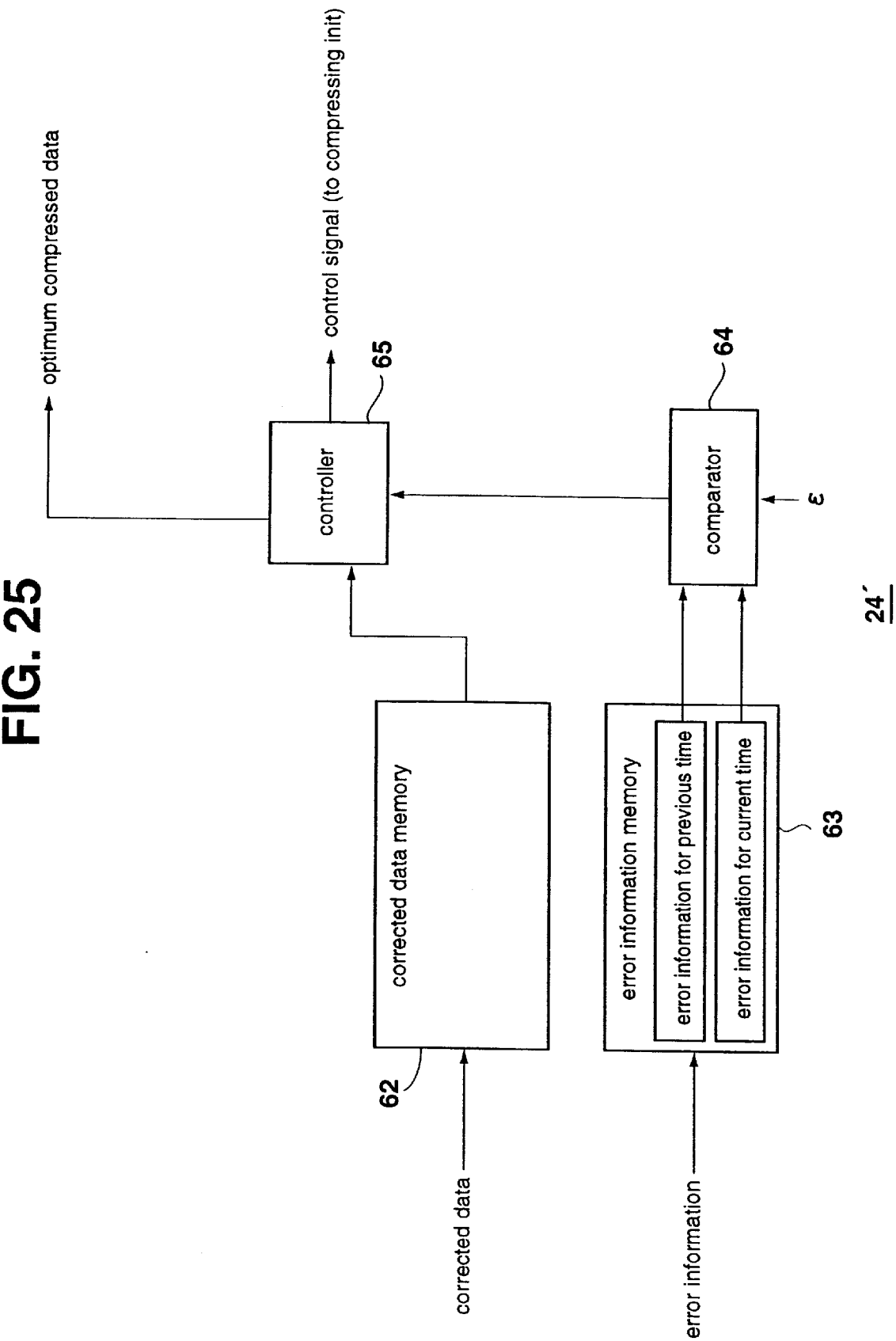
FIG. 25 is a block diagram of a determining unit 24' of FIG. 21.

Referring now to FIG. 25, the determining unit 24' of the third embodiment is explained. In contrast to the determining unit 24 of the second embodiment as shown in FIG. 14, the determining unit 24 does not utilize a prediction coefficient memory 61. In operation, when newly corrected data is supplied by the compressing unit 21, the corrected data memory 62 stores the newly corrected data in place of the corrected data (data corrected the previous time) already stored. In this way a new set of predictive coefficients corresponding to this new corrected data is not outputted from the local decoder 22 when corrected data is updated with new data in this way.

An error information memory 63 stores error information supplied from the error calculator 23. As well as storing the error information currently provided from the error calculator 23, the error information memory 63 stores error information supplied the previous time (already stored error information is held until new error information is supplied even if new error information is supplied). The error information memory 63 is then cleared every time processing of new frames commences.

A comparator 64 compares error information for the current time stored in the error information memory 63 and a prescribed threshold value $\epsilon$, as well as comparing error information for the current time and error information for the previous time if necessary. The comparison results of the comparator 64 are then supplied to a controller 65.

The controller 65 determines whether corrected data stored in the corrected data memory 62 is suitable (optimum) to be taken as original image coding results based on the comparison results of the comparator 64. When the corrected data is confirmed (determined) not to be the most appropriate, a control signal requesting outputting of new corrected data is supplied to the compressing unit 21 (correcting unit 32) (FIG. 5). Further, the controller 65 reads out corrected data stored in the corrected data memory 62, outputs this data to the multiplexor 25 to thereby supply to transmission device and/or the recording device the optimum compressed data. Further, in this case, the controller 65 outputs a control signal to compressing unit 21 indicating completion of coding for one frame of image, so that processing starts at the compressing unit 21 for the following frame as described above.

Figure 26:
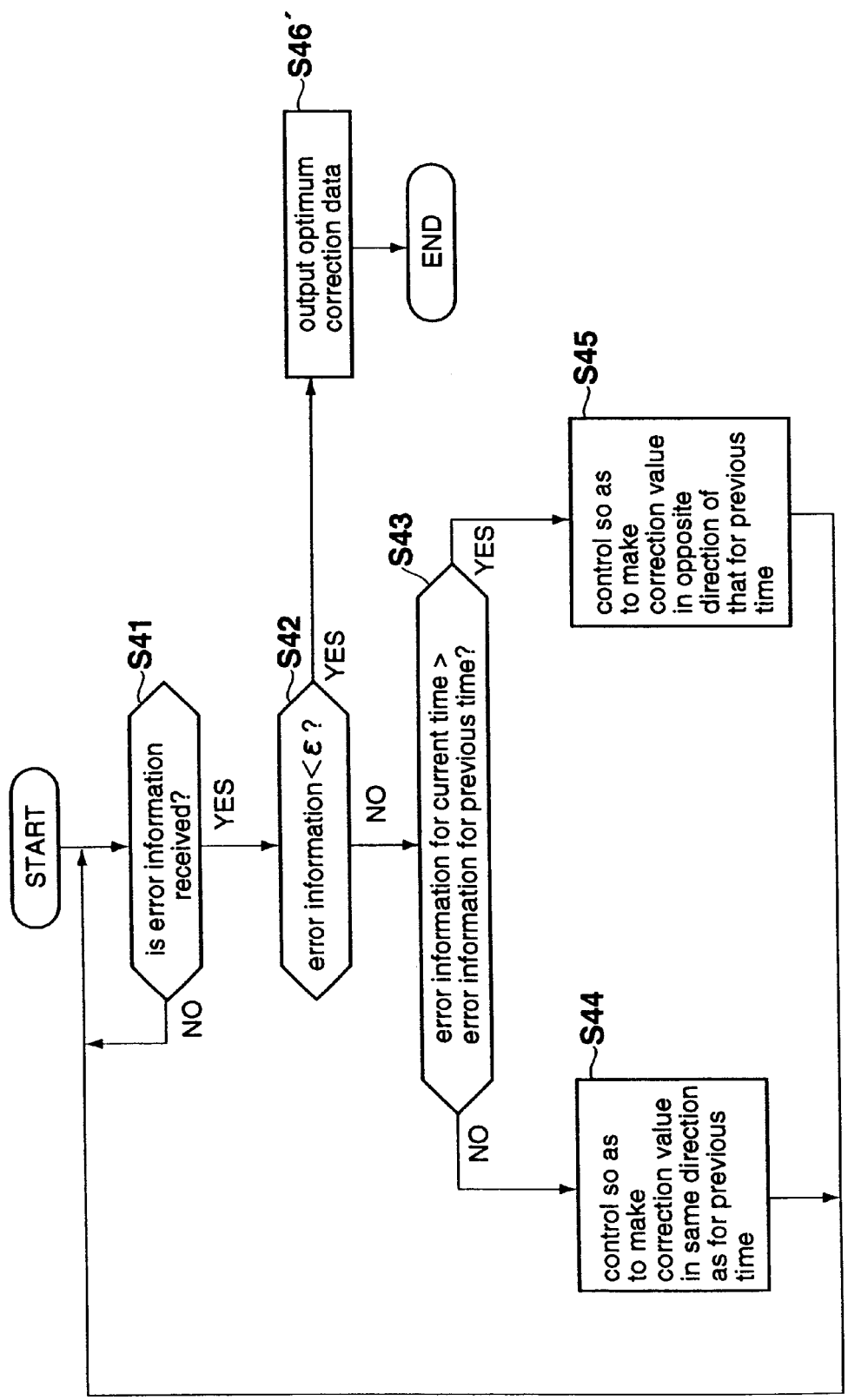
FIG. 26 is a flow chart illustrating the operation of the determining unit of FIG. 25.

Referring now to FIG. 26, the operation of the determining unit of FIG. 25 is further explained. At the determining unit 24', whether or not error information has been received from the error calculator 23 is determined in step S41 by the comparator 64. When it is determined that error information has not been received, step S41 is returned to. When it is determined in step S41 that error information has been received, i.e., that error information is stored at the error information memory 63, step S42 is proceeded to. The comparator 64 then compares the error information currently stored in the error information memory 63 (the current error information) and the prescribed threshold value $\epsilon$ and determines which is the larger.

When it is determined in step S42 that the error information for the current time is equal to or greater than the prescribed threshold value $\epsilon$, the comparator 64 reads out error information for the previous time stored in the error information memory 63. The comparator 64 then compares the error information for the previous time and the error information for the current time in step S43 and determines which is larger.

When processing is then started for one frame and error information is first provided, the error information for the previous time is not stored in the error information memory 63. Therefore, in this case, the processing from step S43 onwards is not carried out at the determining unit 24. A control signal for controlling the correcting unit 32 (FIG. 5) is then outputted and a prescribed initial address is outputted.

When it is determined in step S43 that the current error information is less or equal to than the error information for the previous time, i.e. when the error information is reduced by carrying out correction of compressed data, step S44 is proceeded to. The controller 65 then outputs a control signal indicating that a correction value $\Delta$ is to be changed in the same way as for the previous time to the correcting unit 32 and step S41 is returned to. Further, when it is determined in step S43 that the error information for the current time is greater than the error information for the previous time i.e., when the error information is increased by carrying out correction of compressed data, step S45 is proceeded to and the controller 65 outputs a control signal indicating that the correction value $\Delta$ has been changed in a way that is the opposite of that for the previous time to the correcting unit 32 and step S41 is returned to.

When error information that continues to be reduced rises at a certain timing, the controller 65 outputs a control signal indicating that the corrected value $\Delta$ is to be changed in a manner opposite to that of the previous time to, for example, ½ the size of the case up until that point in time.

The error information is then reduced by repeating the process of steps S41 to S45. In this way, when the error information of the current time is determined in step S42 to be smaller than the prescribed threshold value, step S46' is proceeded to. The controller 65 then reads corrected data stored in the corrected data memory 62 and the estimated valued is supplied to transmitting/recording device as the optimum corrected data.

After this, the error information for the following frame is awaited and the process is repeated in accordance with the flow chart shown in FIG. 26.

With reference now to FIG. 27 a receiving apparatus 4' of the third embodiment is described in detail. In contrast to the receiving apparatus 4 (FIG. 16) of the second embodiment, receiving apparatus 4' does not receive predictive coefficients for each class. Instead, receiving apparatus 4' includes a predictive coefficients ROM 78. Predictive coefficients ROM 78 is loaded with the same data as is predictive coefficients ROM 81' of FIG. 23. In further detail, at the receiving/reproducing device 71, coded data recorded on the recording medium 2 is played-back or coded data transmitted via a transmission path 3 is received and supplied to the blocking unit for class classification 73 and the blocking circuit 77 for predicted value calculation 77.

The blocking unit for class classification 73, an ADRC processing unit 74, a class classifying unit 75 and a blocking unit for predicted value calculation 77 have the same configuration as the blocking unit for class classification 41, the ADRC processing unit 44, the class classifying unit 45 and a blocking unit for predicted value calculation 42. The same processes as for the case in FIG. 23 are therefore carried out on these blocks so that blocks for predicted value calculation are outputted from the blocking circuit for predictive value calculation 77 and class information is outputted from the class classifying unit 75. The blocks for predictive value calculating use and the class information is then supplied to the predicting unit 76.

3×3 predicted values are calculated at the predicting unit 76 in accordance with equation (1) using read predictive coefficients corresponding to the class information and corrected data comprising 5×5 pixel blocks for predicted value calculation supplied from the blocking circuit for predicted value calculation 77. Images for one frame comprised using these kind of predicted values are then outputted by predicting unit 76 as the decoded image.

It is possible to store the mean values of the pixel values comprising the teaching blocks at addresses corresponding to each class at the ROM 81 rather than storing the actual predictive coefficients. In this case, when the class information is considered, pixel values corresponding to this class are outputted. The local decoder 22 of FIG. 19 in such an embodiment does not include the blocking circuit for predicted value calculation 42 nor the predicting unit 82.

In the above, a description has been given of the present invention applied to an image processing apparatus but in addition to coding television signals in standard formats such as the NTSC format this kind of image processing apparatus is particularly effective in the case of encoding so-called high definition format television signals where there is a large amount of data.

In this embodiment, the square sum of the error has been used as the error information but, for example, the absolute value of the error or the sum of the cube or more of the error can also be used as error information. Whichever value is used as the error information can then be decided based, for example, on the convergence etc. of this example. In this embodiment, although each process is carried out for one frame, each process may be carried out for one field, for two or more frames. Furthermore, block coding is carried out taking images for one frame as the object, but the blocks can also, for example, be configured by gathering together pixels of the same position in a plurality of frames linked by a time series.

In this embodiment, correction of compressed data is repeated until the error information is less than a prescribed threshold value ε but it is also possible for an upper limit to be put on the number of times of correcting the compressed data. Namely, for example, when images are transmitted in real time it is necessary for processing of one frame to be finished within a prescribed period but it is not necessary for the error information to converge within a prescribed period of time. By providing an upper limit to the number of times of correction, when error information does not converge to be less than a threshold value ε within a prescribed period of time, processing for this frame can be completed (the corrected data at this time is taken as the coded results) and processing for the next frame can begin.

In this embodiment blocks are configured from images for one frame but can also be configured from, for example, pixels at the same position across a plurality of frames linked by a time series.

In this embodiment, at the compressing unit 21, the image is simply thinned-out i.e. the center pixel occurring at a 3×3 pixel block can be extracted and taken as compressed data. However, at the compressing unit 21, for example, the mean value for the nine pixels comprising a block can also be obtained and taken as the pixel value for the pixel at the center of this block. The number of pixels can then be reduced (thinned out) and made into compressed data.

According to the coding apparatus of the present invention, compressed data obtained by compressing the original image data to a fewer number of pixels is corrected and the corrected data is outputted. The original image data is then estimated based on the corrected data and the predicted value is outputted. An estimation error is then calculated for the predicted value with respect to the original image data. Suitability of the corrected data outputted by the correction means is then determined based on the estimation error. The corrected data is the outputted as the original image data coding results in accordance with determination results. A decoded image that is almost identical to the original data image can therefore be obtained by using this corrected data.

According to coding method of the present invention, correcting compressed data obtained by compressing the original image data to a fewer number of pixels and outputting corrected data, estimating the original image data based on the corrected data and outputting a predicted value and calculating an estimation error for the predicted value with respect to the original image data is repeated until the estimation error becomes less than a prescribed threshold value. The corrected data at the time when the estimation error is less then or equal to a prescribed threshold value is then outputted as coding results for the original image data. A decoded image that is almost identical to the original image can therefore be obtained by using this corrected data.

According to the image decoding apparatus of the present invention, at a decoding means, corrected data is decoded by repeatedly compressing an original image to a fewer number of pixels, correcting compressed data obtained by compressing the original image data and outputting corrected data, estimating the original image data based on the corrected data and outputting a predicted value and calculating an estimation error for the predicted value with respect to the original image data until the estimation error becomes less than a prescribed threshold value. A decoded image that is almost identical to the original image data can therefore be obtained by using this corrected data.

In the recording medium of the present invention corrected data is recorded when an estimation error is less than a prescribed value obtained by repeatedly compressing an original image to a fewer number of pixels, correcting compressed data obtained by compressing the original image data and outputting corrected data, estimating the original image data based on the corrected data and outputting a predicted value and calculating an estimation error for the predicted value with respect to the original image data until the estimation error becomes less than a prescribed threshold value. A decoded image that is almost identical to the original image data can therefore be obtained by using this corrected data.

In summary, the configuration of a first embodiment of the invention comprises the transmitting apparatus of FIG. 3, the compressing unit of FIG. 5, the local decoder of FIG. 8, the error calculator of FIG. 12, the determining unit of FIG. 14 and the receiving apparatus of FIG. 16. The configuration of the second embodiment of the invention comprises the transmitting apparatus of FIG. 17, the compressing unit of FIG. 5, the local decoder of FIG. 18, the error calculator of FIG. 12, the determining unit of FIG. 14 and the receiving apparatus of FIG. 16. The configuration of the third embodiment of the invention comprises the transmitting apparatus of FIG. 21, the compressing unit of FIG. 5, the local decoder of FIG. 23, the error calculator of FIG. 12, the determining unit of FIG. 25 and the receiving apparatus of FIG. 27.

Although only certain embodiments have been described in detail, those having ordinary skill in the art will certainly understand that many modifications are possible without departing from the teachings hereof. All such modifications are intended to be encompassed within the scope of the following claims.

I claim:

1. An apparatus for coding original image data having a plurality of pixels, comprising:

means for generating compressed data having a plurality of pixels, by reducing a number of pixels of said original image data to generate compressed data;

means for generating corrected data by adjusting a value of each pixel of the compressed data;

means for predicting the original image data based on the corrected data to generate predicted data having a plurality of predicted pixels;

means for calculating, with respect to the original image data, a predictive error of the predicted data; and means for determining suitability of the corrected data as coded data based upon the predictive error;

wherein said corrected data generating means, said original image data predicting means, said predictive error calculating means, and said suitability determining means operate repeatedly until the predictive error is less than a predetermined threshold.

2. The apparatus of claim 1, wherein the means for predicting comprises:

means for generating class information of the corrected data; and means for generating the predicted pixels in accordance with the class information.

3. The apparatus of claim 1, wherein the means for predicting, comprises:

means for generating predictive coefficients based upon the corrected data; and means for generating the predicted pixels based upon the corrected data and the predictive coefficients.

4. The apparatus of claim 1, wherein the means for predicting comprises:

means for generating class information based upon a plurality of pixels of the corrected data;

means for generating predictive coefficients for each class based upon the original image data and the corrected data; and means for generating the plurality of predicted pixels based upon the predictive coefficients corresponding to information of each class and the corrected data.

5. The apparatus claim 4 further comprising means for outputting the corrected data as coded data of the original image data based upon the determined suitability, and outputting the corrected data with the predictive coefficients for each class.

6. The apparatus of claim 1, wherein the means for predicting comprises:

a memory for storing predictive coefficients for each class;

means for generating class information based upon a plurality of pixels of the corrected data; and means for reading from the memory the predictive coefficients corresponding to the information of each class, and for generating the predicted pixels based upon the read predictive coefficients and the corrected data.

7. The apparatus of claim 6, further comprising:

means for outputting the corrected data as coded data of the original image data based upon the determined suitability, wherein the predictive coefficients for each class stored in the memory are generated based upon original image data for learning.

8. The apparatus of claim 7, wherein the means for outputting outputs the coded data with the predictive coefficients for each class.

9. The apparatus of claim 1, wherein the means for generating corrected data comprises:

a memory for storing correction values, and wherein the means for generating corrected data corrects the compressed data using the correction values.

10. The apparatus of claim 1, further comprising:

means for outputting the corrected data as coded data of the original image data based upon the determined suitability, wherein the determining means determines suitability of the corrected data by detecting whether the predictive error is less than a prescribed threshold value; and the outputting means outputs the corrected data as the coded data if the predictive error is less than the prescribed threshold value.

11. The apparatus of claim 1, further comprising means for outputting the corrected data as coded data of the original image data based upon the determined suitability of the corrected data as coded data.

12. The apparatus of claim 1, wherein if the corrected data is determined to not be suitable as coded data based upon the predictive error, the means for generating corrected data changes a correction amount applied to the compressed data, and the suitability of the corrected data as coded data is determined again.

13. The apparatus of claim 12, wherein the change to the correction amount and the determination of suitability is repeated until the corrected data is determined to be suitable as coded data.

14. The apparatus of claim 1, wherein the means for generating corrected data corrects the compressed data by adjusting a pixel value.

15. An apparatus for decoding coded data generated by coding image data, comprising:

means for receiving the coded data;

means for decoding the coded data and generating decoded image data, wherein the coded data is generated by the steps of:

generating compressed data having a plurality of pixels by reducing a number of pixels of the original data;

generating corrected data by adjusting a value of each pixel of the compressed data;

predicting the original data based on the corrected data to generate predicted data having a plurality of predicted pixels;

calculating, with respect to the original image data, a predictive error of the predicted data; and determining suitability of the corrected data as coded data based upon the predictive error;

wherein the steps of generating corrected data, predicting the original image data, calculating a predictive error, and determining suitability are repeated unless the predictive error is less than a predetermined threshold.

16. The apparatus of claim 15, wherein the decoding means comprises:

means for generating class information of the coded data; and means for producing the decoded image data in accordance with the class information.

17. The apparatus of claim 15, wherein the coded data includes predictive coefficients to produce the decoded image data, and the means for decoding comprises:

means for generating the decoded image data based upon the predictive coefficients and the coded data.

18. The apparatus of claim 15, wherein the coded data includes predictive coefficients for each class to produce the decoded image data, and the means for decoding comprises:

means for generating class information using a plurality of pixels of the coded data; and means for producing the decoded image data using the predictive coefficients corresponding to the coded data.

19. The apparatus of claim 15, wherein the means for decoding comprises:

a memory for storing predictive coefficients for each class;

means for generating class information using a plurality of pixels of the coded data; and means for reading the predictive coefficients corresponding to the class information from the memory and generating the predicted pixels using the read predictive coefficients and the coded data.

20. The apparatus of claim 19, wherein the predictive coefficients for each class stored in the memory are generated using original image data for learning.

21. The apparatus of claim 15, wherein the coded data is generated by the further step of outputting the corrected data as coded data of the original image data based upon the determined suitability of the corrected data as coded data.

22. The apparatus of claim 15, wherein if the corrected data is not determined to not be suitable as coded data based upon the predictive error, a correction amount applied to the compressed data is changed, and the suitability of the corrected data as coded data is determined again.

23. The apparatus of claim 22, wherein the change to the correction amount and the determination of suitability is repeated until the corrected data is determined to be suitable as coded data.

24. The apparatus of claim 15, wherein correcting the compressed data further includes adjusting a pixel value.

25. A method for coding original data having a plurality of pixels, comprising the steps of:
  generating compressed data having a plurality of pixels by reducing a number of pixels of original image data;
  generating corrected data by adjusting a value of each pixel of the compressed data;
  predicting the original image data based on the corrected data and generating predicted data having a plurality of predicted pixels;
  calculating, with respect to the original image data, a predictive error of the predicted data;
  determining suitability of the corrected data as coded data of the original image based upon the predictive error; and
  repeating the steps of generating corrected data, predicting the original image data, calculating a predictive error, and determining the suitability of the corrected data unless the predictive error is less than a predetermined threshold.

26. The method of claim 25, wherein the step of predicting comprises the steps of:
  generating class information of the corrected data; and
  generating the predicted pixels in accordance with the class information.

27. The method of claim 25, wherein the step of predicting comprises the steps of:
  generating predictive coefficients based upon the corrected data; and
  generating the predicted pixels based upon the corrected data and the predictive coefficients.

28. The method of claim 25, wherein the step of predicting comprises the steps of:
  generating class information based upon a plurality of pixels of the corrected data;
  generating predictive coefficients for each class based upon the original image data and the corrected data; and
  generating the plurality of predicted pixels based upon the predictive coefficients corresponding to information of each class and the corrected data.

29. The method of claim 28, further comprising the step of outputting the corrected data as coded of the original image data based upon the determined suitability, wherein the coded data is output with the predictive coefficients for each class.

30. The method of claim 25, wherein the step of predicting comprises the steps of:
  generating class information based upon a plurality of pixels of the corrected data;
  storing predictive coefficients for each class in a memory; and
  reading from the memory the predictive coefficients corresponding to the information of each class and for generating the predicted pixels based upon the read predictive coefficients and the corrected data.

31. The method of claim 30, wherein stored predictive coefficients for each class are generated based upon original image data for learning.

32. The method of claim 31, further comprising the step of outputting the corrected data as coded data of the original image data based upon the determined suitability, wherein the coded data is output with the predictive coefficients for each class.

33. The method of claim 25, wherein the step of correcting comprises the step of:
  storing correction values, wherein the compressed data is corrected using the correction values.

34. The method of claim 25, wherein the step of determining suitability comprises the steps of:
  detecting whether the predictive error is less than a prescribed threshold value; and
  outputting the corrected data as the coded data if the predictive error is less than the prescribed threshold value.

35. The method of claim 25, further comprising the step of outputting the corrected data as coded data of the original image data based upon the determined suitability of the corrected data as coded data.

36. The method of claim 25, wherein if the corrected data is determined to not be suitable as coded data based upon the predictive error, a correction amount applied to the compressed data is changed, and the suitability of the corrected data as coded data is determined again.

37. The method of claim 36, wherein the change to the correction amount and the determination of suitability is repeated until the corrected data is determined to be suitable as coded data.

38. The method of claim 25, wherein the correcting step further includes generating the corrected data by adjusting a pixel value.

39. A method for decoding coded data generated by coding original image data, comprising the steps of:
  receiving the coded data;
  decoding the coded data and generating decoded image data, wherein the coded data is generated by the steps of:
    generating compressed data having a plurality of pixels, by reducing a number of pixels of said original image data;
    generating corrected data by adjusting a value of each pixel of the compressed data;
    predicting the original image data based on the corrected data and generating predicted data having a plurality of predicted pixels;
    calculating, with respect to the original image data, a predictive error of the predicted data;
    determining suitability of the corrected data as coded data based upon the predictive error; and
    repeating the steps of generating corrected data, predicting the original image data, calculating a predictive error, and determining suitability of the corrected data, unless the predictive error is less than a predetermined threshold.

40. The method of claim 39, wherein the step of decoding the coded data comprises the steps of:
  generating class information of the coded data; and
  producing the decoded image data in accordance with the class information.

41. The method of claim 39, wherein the coded data includes predictive coefficients to produce the decoded image data, and the step of decoding the coded data comprises the step of:
  generating the decoded image data based upon the predictive coefficients and the coded data.

42. The method of claim 39, wherein the coded data includes predictive coefficients for one or more different classes to produce the decoded image data, and the step of decoding the coded data comprises the steps of:
  generating class information using a plurality of pixels of the coded data;
  producing the decoded image data using the predictive coefficients corresponding to the coded data.

43. The method of claim 39, wherein the step of decoding the coded data comprises the steps of:
- storing predictive coefficients for one or more classes in a memory;
- generating class information using a plurality of pixels of the coded data; and
- reading the predictive coefficients corresponding to the class information from the memory and generating the predicted pixels using the read predictive coefficients and the coded data.

44. The method of claim 43, wherein the stored predictive coefficients for each class are generated using original image data for learning.

45. The method of claim 39, wherein the coded data is generated by the further the step of outputting the corrected data as coded data of the original image data based upon the determined suitability of the corrected data as coded data.

46. The method of claim 39, wherein if the corrected data is determined to not be suitable as coded data based upon the predictive error, a correction amount applied to the compressed data is changed, and the suitability of the corrected data as coded data is determined again.

47. The method of claim 46, wherein the change to the correction amount and the determination of suitability is repeated until the corrected data is determined to be suitable as coded data.

48. The method of claim 39, wherein correcting the compressed data further includes adjusting a pixel value to generate the corrected data.

49. An apparatus for coding original image data having a plurality of pixels, comprising;
- a subsampling circuit for generating compressed data by reducing a number of pixels of original image data;
- a correcting circuit for generating corrected data by adjusting a value of each pixel of the compressed data;
- a predicting circuit for predicting the original image data based on the corrected data to generate predicted data having a plurality of predicted pixels;
- a calculator for calculating, with respect to the original image data, a predictive error of the predicted data; and
- a determining circuit for determining suitability of the corrected data as coded data based upon the predictive error;
- wherein the correcting circuit, the predicting circuit, the calculator, and the determining circuit operate repeatedly unless the predictive error is less than a predetermined threshold.

50. The apparatus of claim 49, wherein the predicting circuit comprises:
- a circuit for generating class information of the corrected data; and
- a circuit for generating the predicted pixels in accordance with the class information.

51. The apparatus of claim 49, wherein the predicting circuit, comprises:
- a circuit for generating predictive coefficients based upon the corrected data; and
- a circuit for generating the predicted pixels based upon the corrected data and the predictive coefficients.

52. The apparatus of claim 49, wherein the predicting circuit comprises:
- a circuit for generating class information based upon a plurality of pixels of the corrected data;
- a circuit for generating predictive coefficients for each class based upon the original image data and the corrected data; and
- a circuit for generating the plurality of predicted pixels based upon the predictive coefficients corresponding to information of each class and the corrected data.

53. The apparatus of claim 52, further comprising an output circuit for outputting the corrected data as coded data of the original image data based upon the determined suitability, wherein the output circuit outputs the coded data with the predictive coefficients for each class.

54. The apparatus of claim 49, wherein the predicting circuit comprises;
- a memory for storing predictive coefficients for at least one class;
- a circuit for generating class information based upon a plurality of pixels of the corrected data; and
- a circuit for reading from the memory the predictive coefficients corresponding to the information of each class and for generating the predicted pixels based upon the read predictive coefficients and the corrected data.

55. The apparatus of claim 54, wherein the predictive coefficients for each class stored in the memory are generated based upon original image data for learning.

56. The apparatus of claim 55, further comprising an output circuit for outputting the corrected data as coded data of the original image data based upon the determined suitability, wherein the output circuit outputs the coded data with the predictive coefficients for each class.

57. The apparatus of claim 49, wherein the correcting circuit comprises:
- a memory for storing correction values, wherein the correcting circuit corrects the compressed data using the correction values.

58. The apparatus of claim 49, further comprising:
- an output circuit for outputting the corrected data as coded data of the original image data based upon the determined suitability, wherein
- the determining circuit determines suitability of the corrected data by detecting whether the predictive error is less than a prescribed threshold value; and
- the output circuit outputs the corrected data as the coded data if the predictive error is less than the prescribed threshold value.

59. The apparatus of claim 49, further comprising an output circuit for outputting the corrected data as coded data of the original image data based upon the determined suitability of the corrected data as coded data.

60. The apparatus of claim 49, wherein if the corrected data is determined to not be suitable as coded data based upon the predictive error, the correcting circuit changes a correction amount applied to the compressed data, and the suitability of the corrected data as coded data is determined again.

61. The apparatus of claim 60, wherein the change to the correction amount and the determination of suitability is repeated until the corrected data is determined to be suitable as coded data.

62. The apparatus of claim 49, wherein the correcting circuit corrects the compressed data by adjusting a pixel value to generate the corrected data.

63. An apparatus for decoding coded data generated by coding image data, comprising;
- a circuit for receiving the coded data;
- a decoder for decoding the coded data and generating decoded image data, wherein the coded data is generated by the steps of:
  - generating compressed data having a plurality of pixels by reducing a number of pixels of original image data;

generating corrected data by adjusting a value of each pixel of the compressed data;

predicting the original image data based on the corrected data to generate predicted data having a plurality of predicted pixels;

calculating, with respect to the original image data, a predictive error of the predicted data; and determining suitability of the corrected data as coded data based upon the predictive error; and repeating the steps of correcting the compressed data, predicting the original image data, calculating a predictive error and determining the suitability of the corrected data, until the predictive error is below a predetermined threshold.

64. The apparatus of claim 63, wherein the decoder comprises:
a circuit for generating class information of the coded data; and
a circuit for producing the decoded image data in accordance with the class information.

65. The apparatus of claim 63, wherein the coded data includes predictive coefficients to produce the decoded image data, and the decoder comprises:
a circuit for generating the decoded image data based upon the predictive coefficients and the coded data.

66. The apparatus of claim 63, wherein the coded data includes predictive coefficients for each class to produce the decoded image data, and the decoder comprises:
a circuit for generating class information using a plurality of pixels of the coded data;
a circuit for producing the decoded image data using the predictive coefficients corresponding to the coded data.

67. The apparatus of claim 63, wherein the decoder comprises:
a memory for storing predictive coefficients for each class;
a circuit for generating class information using a plurality of pixels of the coded data; and
a circuit for reading the predictive coefficients corresponding to the class information from the memory and generating the predicted pixel using the read predictive coefficients and the coded data.

68. The apparatus of claim 67, wherein the predictive coefficients for each class stored in the memory are generated using original image data for learning.

69. The apparatus of claim 63, wherein the coded data is generated by the further step of outputting the corrected data as coded data of the original image data based upon the determined suitability of the corrected data as coded data.

70. The apparatus of claim 63, wherein if the corrected data is determined to not be suitable as coded data based upon the predictive error, a correction amount applied to the compressed data is changed, and the suitability of the corrected data as coded data is determined again.

71. The apparatus of claim 70, wherein the change to the correction amount and the determination of suitability is repeated until the corrected data is determined to be suitable as coded data.

72. The apparatus of claim 63, wherein correcting the compressed data to generate the corrected data includes adjusting a pixel value.

73. A method of coding data having a plurality of samples, comprising the steps of:
generating compressed data having a plurality of samples by reducing a number of samples of original data;
generating corrected data by adjusting a value of each sample of the compressed data;

predicting the original data based on the corrected data to generate predicted data having a plurality of predicted samples;

calculating, with respect to the original data, a predictive error of the predicted data; and determining suitability of the corrected data as coded data of the original data based upon the predictive error;

wherein the steps of generating corrected data, predicting the original data, calculating a predictive error, and determining the suitability of the corrected data are repeated unless the predictive error is less than a predetermined threshold.

74. The method of claim 73, wherein the step of predicting the original data comprises the steps of:
generating class information of the corrected data; and
generating the predicted samples in accordance with the class information.

75. The method of claim 73, wherein the step of predicting, the original data comprises the steps of:
generating predictive coefficients based upon the corrected data; and
generating the predicted samples based upon the corrected data and the predictive coefficients.

76. The method of claim 73, wherein the step of predicting the original data comprises the steps of:
generating class information based upon a plurality of samples of the corrected data;
generating predictive coefficients for each class based upon the original data and the corrected data; and
generating the plurality of predicted samples based upon the predictive coefficients corresponding to information of each class and the corrected data.

77. The method of claim 76, further comprising the step of outputting the coded data, wherein the coded data is output with the predictive coefficients for each class.

78. The method of claim 73, wherein the step of predicting comprises the steps of:
storing predictive coefficients for one or more classes in a memory;
generating class information based upon a plurality of samples of the corrected data; and
reading from the memory the predictive coefficients corresponding to the information of each class and for generating the predicted samples based upon the read predictive coefficients and the corrected data.

79. The method of claim 78, wherein stored predictive coefficients for each class are generated based upon original data for learning.

80. The method of claim 79, further comprising the step of outputting the coded data, wherein the coded data is output with the predictive coefficients for each class.

81. The method of claim 73, wherein the step of correcting comprises the step of:
storing correction values, wherein the compressed data is corrected using the correction values.

82. The method of claim 73, wherein the step of determining suitability comprises the steps of:
detecting whether the predictive error is less than a prescribed threshold value; and
outputting the corrected data as the coded data if the predictive error is less than the prescribed threshold value.

83. The method of claim 73, wherein the coded data is generated by the further step of outputting the corrected data as coded data of the original image data based upon the determined suitability of the corrected data as coded data.

84. The method of claim 73, wherein if the corrected data is determined to not be suitable as coded data based upon the predictive error, a correction amount applied to the compressed data is changed, and the suitability of the corrected data as coded data is determined again.

85. The method of claim 84, wherein the change to the correction amount and the determination of suitability is repeated until the corrected data is determined to be suitable as coded data.

86. The method of claim 73, wherein correcting the compressed data to generate the corrected data includes adjusting a pixel value.

87. A method for decoding coded data generated by coding data, comprising the steps of:
   receiving the coded data;
   decoding the coded data and generating decoded data, wherein the coded data is generated by the steps of:
      generating compressed data having a plurality of samples by reducing a number of samples of original data;
      generating corrected data by adjusting a value of each sample of the compressed data;
      predicting the original data based on the corrected data to generate predicted data having a plurality of predicted samples;
      calculating, with respect to the original data, a predictive error of the predicted data; and
      determining suitability of the corrected data as coded data based upon the predictive error;
      wherein the steps of generating corrected data, predicting the original data, calculating a predictive error, and determining the suitability of the corrected data are repeated unless the predictive error is less than a predetermined threshold.

88. The method of claim 87, wherein the step of decoding the coded data comprises the steps of:
   generating class information of the coded data; and
   producing the decoded data in accordance with the class information.

89. The method of claim 87, wherein the coded data includes predictive coefficients to produce the decoded data, and the step of decoding the coded data comprises the step of:
   generating the decoded data based upon the predictive coefficients and the coded data.

90. The method of claim 87, wherein the coded data includes predictive coefficients for one or more classes to produce the decoded data, and the step of decoding the coded data comprises the steps of:
   generating class information using a plurality of samples of the coded data;
   producing the decoded data using the predictive coefficients corresponding to the coded data.

91. The method of claim 87, wherein the step of decoding the coded data comprises the steps of:
   storing predictive coefficients for one or more classes;
   generating class information using a plurality of samples of the coded data; and
   reading the predictive coefficients corresponding to the class information from the memory and generating the predicted sample using the read predictive coefficients and the coded data.

92. The method of claim 91, wherein the stored predictive coefficients for each class are generated using original data for learning.

93. The method of claim 87, wherein the coded data is generated by the further step of outputting the corrected data as coded data of the original image data based upon the determined suitability of the corrected data as coded data.

94. The method of claim 87, wherein if the corrected data is determined to not be suitable as coded data based upon the predictive error, a correction amount applied to the compressed data is changed, and the suitability of the corrected data as coded data is determined again.

95. The method of claim 94, wherein the change to the correction amount and the determination of suitability is repeated until the corrected data is determined to be suitable as coded data.

96. The method of claim 87, wherein correcting the compressed data to generate corrected data includes adjusting a pixel value.

97. An apparatus for coding original data having a plurality of samples, comprising:
   a subsampling circuit for generating compressed data having a plurality of samples by reducing a number of samples of original data;
   a correcting circuit for generating corrected data by adjusting a value of each sample of the compressed data;
   a predicting circuit for predicting the original data based on the corrected data to generate predicted data having a plurality of predicted samples;
   a calculator for calculating, with respect to the original data, a predictive error of the predicted data; and
   a determining circuit for determining suitability of the corrected data as coded data based upon the predictive error;
   wherein the correcting circuit, the predicting circuit, the calculator, and the determining circuit operate repeatedly unless the predictive error is less than a predetermined threshold.

98. The apparatus of claim 97, wherein the predicting circuit comprises:
   a circuit for generating class information of the corrected data; and
   a circuit for generating the predicted samples in accordance with the class information.

99. The apparatus of claim 97, wherein the predicting circuit, comprises:
   a circuit for generating predictive coefficients based upon the corrected data; and
   a circuit for generating the predicted samples based upon the corrected data and the predictive coefficients.

100. The apparatus of claim 97, wherein the predicting circuit comprises:
   a circuit for generating class information based upon a plurality of samples of the corrected data;
   a circuit for generating predictive coefficients for each class based upon the original data and the corrected data; and
   a circuit for generating the plurality of predicted samples based upon the predictive coefficients corresponding to information of each class and the corrected data.

101. The apparatus of claim 100, further comprising an output circuit for outputting the corrected data as coded data of the original image data based upon the determined suitability, wherein the output circuit outputs the coded data with the predictive coefficients for each class.

102. The apparatus of claim 97, wherein the predicting circuit comprises:

a memory for storing predictive coefficients for one or more classes;

a circuit for generating class information based upon a plurality of samples of the corrected data; and a circuit for reading from the memory the predictive coefficients corresponding to the information of each class and for generating the predicted samples based upon the read predictive coefficients and the corrected data.

103. The apparatus of claim 102, wherein the predictive coefficients for each class stored in the memory are generated based upon original data for learning.

104. The apparatus of claim 103, further comprising an output circuit for outputting the corrected data as coded data of the original data based upon the determined suitability, wherein the output circuit outputs the coded data with the predictive coefficients for each class.

105. The apparatus of claim 97, wherein the correcting circuit comprises:

a memory for storing correction values, wherein the correcting circuit corrects the compressed data using the correction values.

106. The apparatus of claim 97, further comprising:

an output circuit for outputting the corrected data as coded data of the original data based upon the determined suitability; wherein the determining circuit determines suitability of the corrected data by detecting whether the predictive error is less than a prescribed threshold value; and the output circuit outputs the corrected data as the coded data if the predictive error is less than the prescribed threshold value.

107. The apparatus of claim 97, further comprising an output circuit for outputting the corrected data as coded data of the original image data based upon the determined suitability of the corrected data as coded data.

108. The apparatus of claim 97, wherein if the corrected data is determined to not be suitable as coded data based upon the predictive error, the correcting circuit changes a correction amount applied to the compressed data, and the suitability of the corrected data as coded data is determined again.

109. The apparatus of claim 108, wherein the change to the correction amount and the determination of suitability is repeated until the corrected data is determined to be suitable as coded data.

110. The apparatus of claim 97, wherein the correcting circuit generates corrected data by adjusting a pixel value.

111. An apparatus for decoding coded data generated by coding original data, comprising:

a circuit for receiving the coded data;

a decoder for decoding the coded data and generating decoding data, wherein the coded data is generated by the steps of:

generating compressed data having a plurality of samples by reducing a number of samples of said original data;

generating corrected data by adjusting a value of each sample of the compressed data;

predicting the original data based on the corrected data to generate predicted data having a plurality of predicted samples;

calculating, with respect to the original data, a predictive error of the predicted data; and determining suitability of the corrected data as coded data based upon the predictive error;

wherein the steps of correcting the compressed data, predicting the original data, calculating a predictive error, and determining the suitability of the corrected data are continually repeated unless the predictive error is less than a predetermined threshold.

112. The apparatus of claim 111, wherein the decoder comprises:

a circuit for generating class information of the coded data; and a circuit for producing the decoded data in accordance with the class information.

113. The apparatus of claim 111, wherein the coded data includes predictive coefficients to produce the decoded data, and the decoder comprises:

a circuit for generating the decoded data based upon the predictive coefficients and the coded data.

114. The apparatus of claim 111, wherein the coded data includes predictive coefficients for one or more classes to produce the decoded data, and the decoder comprises;

a circuit for generating class information using a plurality of samples of the coded data;

a circuit for producing the decoded data using the predictive coefficients corresponding to the coded data.

115. The apparatus of claim 111, wherein the decoder comprises:

a memory for storing predictive coefficients for one or more classes;

a circuit for generating class information using a plurality of samples of the coded data; and a circuit for reading the predictive coefficients corresponding to the class information from the memory and generating the predicted sample using the read predictive coefficients and the coded data.

116. The apparatus of claim 115, wherein the predictive coefficients for each class stored in the memory are generated using original data for learning.

117. The apparatus of claim 111, wherein the coded data is generated by the further step of outputting the corrected data as coded data of the original image data based upon the determined suitability of the corrected data as coded data.

118. The apparatus of claim 111, wherein if the corrected data is determined to not be suitable as coded data based upon the predictive error, a correction amount applied to the compressed data is changed, and the suitability of the corrected data as coded data is determined again.

119. The apparatus of claim 118, wherein the change to the correction amount and the determination of suitability is repeated until the corrected data is determined to be suitable as coded data.

120. The apparatus of claim 111, wherein the corrected data is generated by adjusting a pixel value.

* * * * *